US012177309B2

(12) United States Patent
Yan et al.

(10) Patent No.: US 12,177,309 B2
(45) Date of Patent: Dec. 24, 2024

(54) IMAGE PROCESSING METHOD, APPARATUS, DEVICE, AND COMPUTER-READABLE STORAGE MEDIUM

(71) Applicant: Tencent Technology (Shenzhen) Company Limited, Guangdong (CN)

(72) Inventors: Wei Yan, Shenzhen (CN); Xuefen Yuan, Shenzhen (CN); Feng Lin, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 17/901,716

(22) Filed: Sep. 1, 2022

(65) Prior Publication Data

US 2022/0417343 A1   Dec. 29, 2022

Related U.S. Application Data

(63) Continuation of application No. PCT/CN2021/107054, filed on Jul. 19, 2021.

(30) Foreign Application Priority Data

Aug. 7, 2020   (CN) .......................... 202010791419.9

(51) Int. Cl.
   *G06F 15/16*   (2006.01)
   *G06F 16/583*  (2019.01)
   (Continued)

(52) U.S. Cl.
   CPC ............ *H04L 67/55* (2022.05); *G06F 16/583* (2019.01); *H04L 67/306* (2013.01)

(58) Field of Classification Search
   CPC ...... H04L 67/55; H04L 67/306; G06F 16/583
   (Continued)

(56) References Cited

U.S. PATENT DOCUMENTS 9,977,570 B2 * 5/2018 Stallings ................ H04N 23/63
11,588,913 B1 * 2/2023 Castro ................... H04L 51/224
(Continued)

FOREIGN PATENT DOCUMENTS

CN   103412876 A   11/2013
CN   104243275 A   12/2014
(Continued)

OTHER PUBLICATIONS

Chinese Office Action issued Apr. 15, 2023 in Application No. 202010791419.9 with English Translation (31 pages).
(Continued)

*Primary Examiner* — Alan S Chou
(74) *Attorney, Agent, or Firm* — ArentFox Schiff LLP

(57) ABSTRACT

An image processing method includes displaying an object following page in a first session page in response to an object following operation performed on a first image, the object following page including a setting control corresponding to at least one display object in the first image. The first session page is a page corresponding to a local user account. The method also includes creating an object following relationship between a selected display object and the local user account in response to a trigger operation performed on the setting control in the object following page. The object following relationship provides an image update prompt to the local user account, the image update prompt prompting to view an image associated with the selected display object. Apparatus and non-transitory computer-readable storage medium counterpart embodiments are also contemplated.

18 Claims, 20 Drawing Sheets

(51) Int. Cl.
*H04L 67/306*     (2022.01)
*H04L 67/55*      (2022.01)

(58) Field of Classification Search
USPC .......................................................... 709/203
See application file for complete search history.

(56)                References Cited

U.S. PATENT DOCUMENTS

| | | | |
|---|---|---|---|
| 2014/0032664 | A1* | 1/2014 | Wookey .............. G06F 16/9535 |
| | | | 709/204 |
| 2014/0244772 | A1 | 8/2014 | Li et al. |
| 2015/0112960 | A1* | 4/2015 | Markson ............. G06F 16/9535 |
| | | | 707/706 |
| 2017/0093967 | A1* | 3/2017 | Grosz ..................... H04L 67/53 |
| 2017/0201483 | A1* | 7/2017 | Jones ...................... H04L 67/02 |
| 2018/0349485 | A1* | 12/2018 | Carlisle .............. G06F 16/9535 |

FOREIGN PATENT DOCUMENTS

| | | |
|---|---|---|
| CN | 104506544 A | 4/2015 |
| CN | 110414404 A | 11/2019 |
| CN | 112751681 A | 5/2021 |
| CN | 112817671 A | 5/2021 |

OTHER PUBLICATIONS

International Search Report and Written Opinion issued Oct. 27, 2021 in International Application No. PCT/CN2021/107054 with English Translation (10 pages).

* cited by examiner

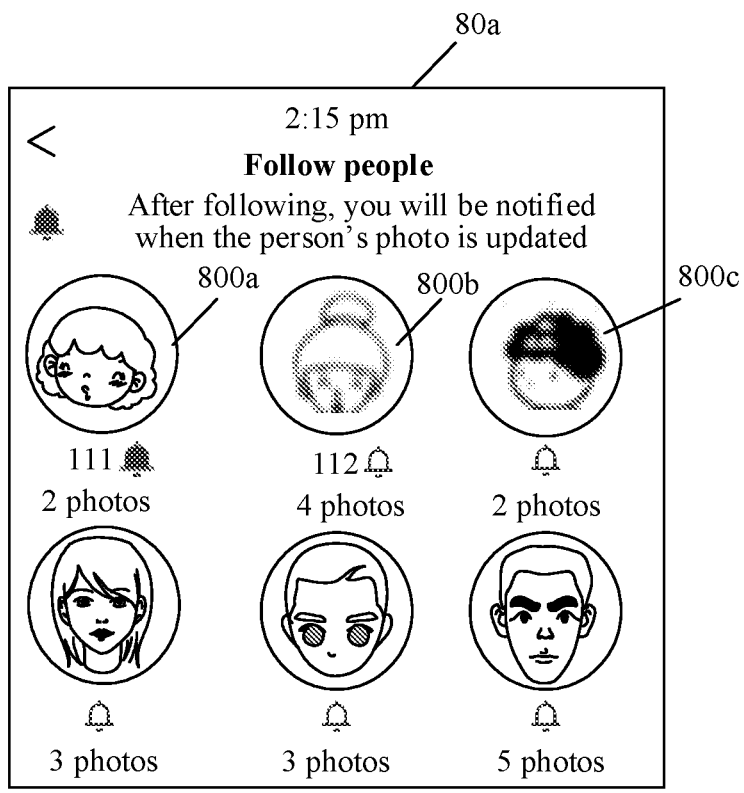
FIG. 8A
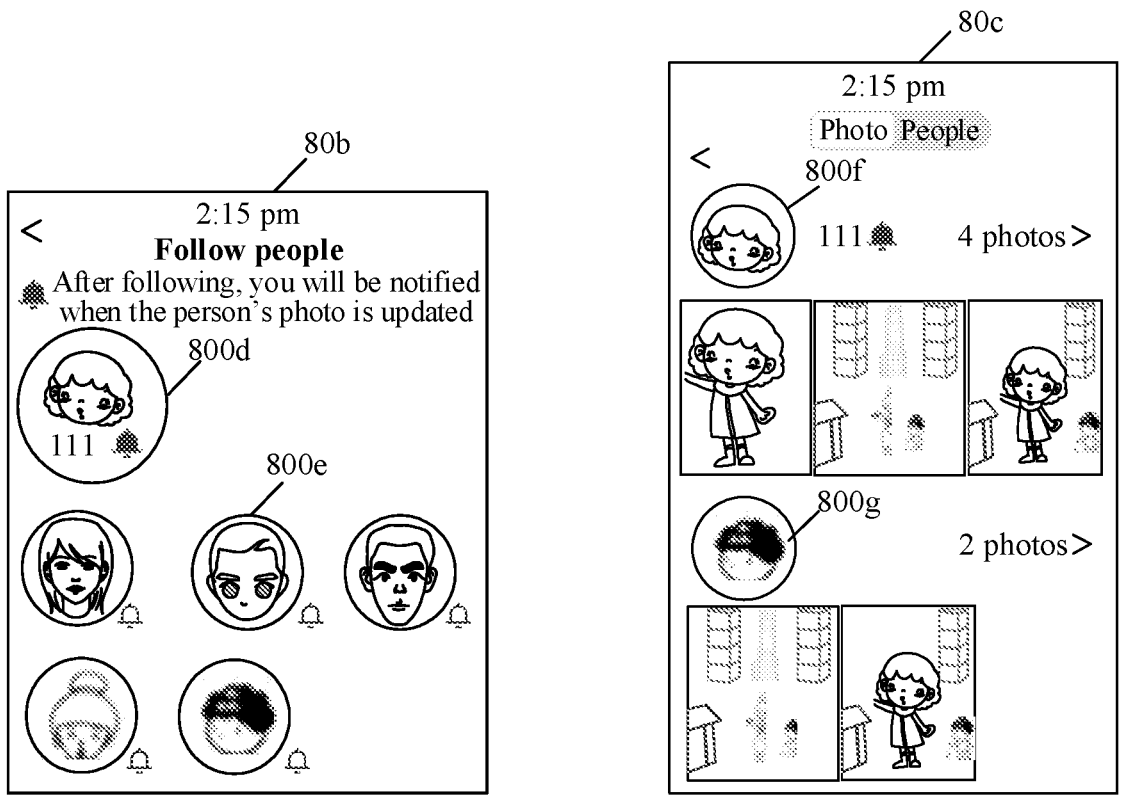
FIG. 8B
FIG. 8C

IMAGE PROCESSING METHOD, APPARATUS, DEVICE, AND COMPUTER-READABLE STORAGE MEDIUM

RELATED APPLICATIONS

This application is a continuation of International Application No. PCT/CN2021/107054, filed on Jul. 19, 2021, which claims priority to Chinese Patent Application No. 202010791419.9, entitled "IMAGE PROCESSING METHOD, APPARATUS, DEVICE, AND COMPUTER-READABLE STORAGE MEDIUM" and filed on Aug. 7, 2020. The entire disclosures of the prior applications are hereby incorporated by reference.

FIELD OF THE TECHNOLOGY

This application relates to the field of Internet technologies, including an image processing method, apparatus, device, and computer-readable storage medium.

BACKGROUND OF THE DISCLOSURE

With the rapid development of network technologies and clients, various communication applications (APPs) are widely used by the public.

In daily life, users often share portrait photos through communication applications. For example, user A shares photos C, E, . . . , and G through a communication group in a communication application, and a user terminal corresponding to user B receives the photos C, E, . . . , and G through the communication group.

SUMMARY

Embodiments of this disclosure provide an image processing method and apparatus, a device, and a non-transitory computer-readable storage medium.

In an embodiment, an image processing method includes displaying an object following page in a first session page in response to an object following operation performed on a first image, the object following page including a setting control corresponding to at least one display object in the first image. The first session page is a page corresponding to a local user account. The method further includes creating an object following relationship between a selected display object and the local user account in response to a trigger operation performed on the setting control in the object following page, the object following relationship providing an image update prompt to the local user account. The image update prompt prompts to view an image associated with the selected display object.

In an embodiment, an image processing method includes obtaining an object following request transmitted by a first user account in a communication group, the object following request including a selected display object in a first image. The method also includes creating an object following relationship between the first user account and the selected display object according to the object following request. The method further includes obtaining a second image, determining at least one display object in the second image, and determining, in response to a determination that the at least one display object in the second image comprises an object matching the selected display object. A portion of the second image includes the object matching the selected display object as a target image. The method includes pushing image update prompt information for the target image to the first user account according to the object following relationship.

In an embodiment, an image processing apparatus includes processing circuitry configured to display an object following page in a first session page in response to an object following operation performed on a first image. The object following page includes a setting control corresponding to at least one display object in the first image, and the first session page being a page corresponding to a local user account. The processing circuitry is further configured to create an object following relationship between a selected display object and the local user account in response to a trigger operation performed on the setting control in the object following page. The object following relationship provides an image update prompt to the local user account, the image update prompt prompting to view an image associated with the selected display object.

BRIEF DESCRIPTION OF THE DRAWINGS

To describe technical solutions in the embodiments of this disclosure or in the related art, the following briefly describes accompanying drawings describing the embodiments.

FIG. 8A to FIG. 8C are schematic diagrams of an interface of visualized object following setting according to an embodiment of this disclosure.

DESCRIPTION OF EMBODIMENTS

The technical solutions in the embodiments of this disclosure are described in the following with reference to the accompanying drawings in the embodiments of this disclosure. The described embodiments are some rather than all of the embodiments of this disclosure. Other embodiments obtained by persons of ordinary skill in the art based on the embodiments of this disclosure shall fall within the protection scope of this disclosure.

Figure 1A:
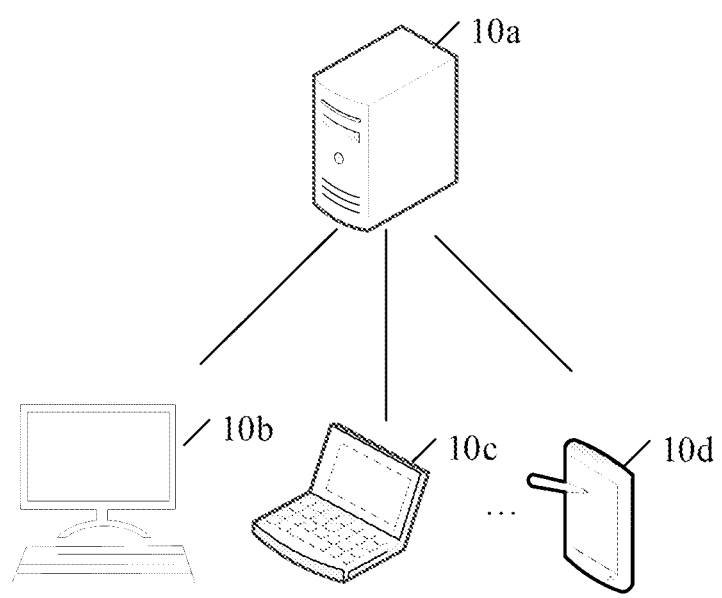
FIG. 1A is a schematic diagram of a system architecture according to an embodiment of this disclosure.

Referring to FIG. 1A, FIG. 1A is a schematic diagram of a system architecture according to an embodiment of this disclosure. As shown in FIG. 1A, the system architecture may include a server 10a and a user terminal cluster. The user terminal cluster may include user terminal 10b, user terminal 10c, . . . , and user terminal 10d. There is a communication connection between the user terminals in the cluster. For example, there is a communication connection between the user terminal 10b and the user terminal 10c, there is a communication connection between the user terminal 10b and the user terminal 10d, and there is also a communication connection between the other user terminals. There may be a communication connection between any user terminal in the user terminal cluster and the server 10a. For example, there is a communication connection between the user terminal 10b and the server 10a, there is a communication connection between the user terminal 10c and the server 10a, and there is also a communication connection between each of the other user terminals and the server 10a. The communication connections (including the communication connections between the user terminals and the communication connections between the user terminals and the server 10a) may be direct or indirect wired connections or may be direct or indirect wireless connections, which are not limited in this disclosure.

The server 10a provides services for the user terminal cluster through the communication connections. The server 10a is a back-end server of a communication application Z, and the communication application Z is installed on the user terminal 10b, the user terminal 10c, . . . , and the user terminal 10d. In an embodiment of this disclosure, the user terminal 10b is used as a transmitting terminal which may transmit an image to another user terminal through a communication group, and the user terminal 10c is used as a receiving terminal to receive the image transmitted by another user terminal through the communication group. The user terminal 10b is operated by a user to transmit a first image and a first transmission request to the server 10a. The first transmission request is used for instructing the server 10a to transmit the first image to user terminals respectively corresponding to communication user accounts included in the communication group (also including the user terminal 10c, where the following description takes the user terminal 10c as an example).

After obtaining the first image and the first transmission request, the server 10a first determines whether the first image includes a display object. If the first image includes a display object, the server 10a also transmits object following prompt information to the user terminal 10c to prompt the user corresponding to the user terminal 10c while transmitting the first image to the user terminal 10c according to the first transmission request, to prompt a user corresponding to the user terminal 10c to follow a target display object (selected display object) in the first image. As can be seen from the above, a display of the user terminal 10c may not only display the first image, but also display the object following prompt information. The user terminal 10c may be operated by the corresponding user to determine the target display object in the first image in response to a trigger operation performed on the object following prompt information, and create an object following relationship between the target display object and the local user account.

Subsequently, when receiving a second image and a second transmission request transmitted by a transmitting terminal (in this case, the transmitting terminal is not limited to the user terminal 10b), the server 10a first determines whether the second image includes an object matching with the target display object. If yes, the server 10a may determine a first user account (the local user account corresponding to the user terminal 10c) according to the target display object and the object following relationship. Then, according to the second transmission request, the server 10a also transmits image update prompt information for the second image to the user terminal 10c while transmitting the second image to the user terminal 10c logged in with the first user account. In response to a trigger operation performed on the image update prompt information, the user terminal 10c may display on its corresponding display a sub-image including the object matching with the target display object in the second image, and filter out images not including the object matching with the target display object in the second image. In this way, the user can conveniently view images related to the user, thereby improving the efficiency of viewing messages in the communication group by the user.

Figure 1B:
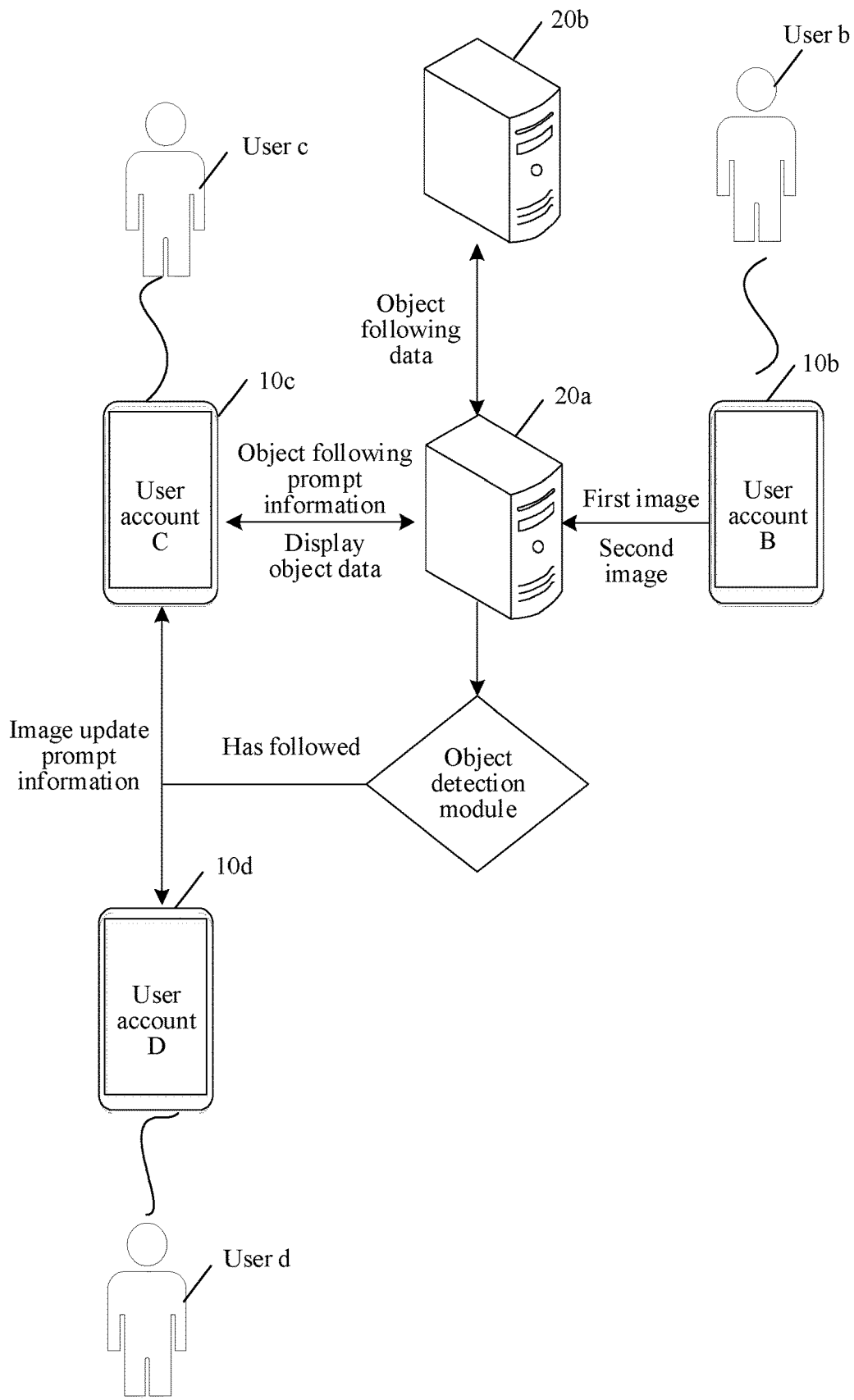
FIG. 1B is a schematic structural diagram of a communication process according to an embodiment of this disclosure.

The above process of FIG. 1A can be understood by further referring to FIG. 1B. FIG. 1B is a schematic structural diagram of a communication process according to an embodiment of this disclosure. As shown in FIG. 1B, the communication architecture may include a server cluster and a user terminal cluster. The server cluster may include a back-end server 20a (i.e., the server 10a in FIG. 1A) and a storage server 20b. In this case, the storage server 20b is an independent server. The back-end server 20a may transmit generated or received data to the storage server 20b for data storage, and when data is needed, may transmit a request to the storage server 20b to request the data. Alternatively, the server cluster may include the back-end server 20a only. In this case, the storage server 20b is not an independent server, but is a memory or a storage database in the back-end server 20a to store the data generated or received by the back-end server 20a, which is not limited herein.

Similarly, there are communication connections between the user terminals (i.e., user terminal 10b, user terminal 10c, and user terminal 10d) in the cluster in FIG. 1B, and there are communication connections between the user terminals and the back-end server 20a. It can be seen from the description of FIG. 1A that the back-end server 20a provides services for the communication application Z in the user terminal cluster. It is assumed that the communication group includes three user accounts, namely, user account B, user account C, and user account D, where user b logs in the user account B on the user terminal 10b, user c logs in the user account C on the user terminal 10c, and user d logs in the user account D on the user terminal 10d.

As shown in FIG. 1B, the user b transmits a first image to the communication group through the user terminal 10b. After obtaining the first image, the back-end server 20a invokes an object detection module to perform object detection on the first image. If the first image includes a display object (e.g., a human face) set by an application system, the back-end server 20a, while transmitting the first image to the user terminal 10b logged in with the user account B, the user terminal 10c logged in with the user account C, and the user terminal 10d logged in with the user account D, also transmits object following prompt information to the user terminal 10b, the user terminal 10c, and the user terminal 10d. It can be understood that the object detection module may be provided by a third-party software development kit (SDK).

As shown in FIG. 1B, the user terminal 10c logged in with the user account C receives the object following prompt information transmitted by the back-end server 20a. The user terminal 10c may obtain information regarding at least one display object (display object data) in the first image from the back-end server 20a in response to a trigger operation performed on the object following prompt information. If the storage server 20b is a memory or database in the back-end server 20a, the back-end server 20a may directly obtain the at least one display object data from the storage server 20b and transmit same to the user terminal 10c. If the storage server 20b is an independent server, the back-end server 20a may first transmit the at least one display object data to the storage server 20b, and then when the at least one display object data is needed, may transmit a request to the storage server 20b to request the at least one display object data.

According to the at least one display object data, the corresponding display of the user terminal 10c may display an object following page, the object following page displaying at least one display object corresponding to the at least one display object data. The user terminal 10c displays a name setting page including the target display object in response to a trigger operation performed on a target display object in the object following page. The user c inputs a target name in the name setting page, and then clicks a confirmation control in the name setting page, so that the user terminal 10c transmits an object following request to the back-end server 20a. According to the object following request, the back-end server 20a creates an object following relationship for the local user account of the user terminal 10c (i.e., the user account C), the target name, and the target display object. It can be understood that the object following request carries the user account C, the target name, and the target display object. As shown in FIG. 1B, after creating the object following relationship, the back-end server 20a may store object following data to the storage server 20b. The object following data may include the user account C, the target name, the target display object, and the object following relationship.

Still referring to FIG. 1B, when the user b transmits a second image to the communication group through the user terminal 10b, the back-end server 20a calls the object detection module again to perform object detection on the second image, obtains at least one display object data in the second image, and then queries the storage server 20b to determine whether there is a target display object in the second image that has been followed by the user accounts (including all user accounts in the communication group), or whether there is an object in the second image matching with the target display object. If yes, the back-end server 20a obtains an object following relationship, determines a first user account according to the object following relationship and the target display object, and then pushes image update prompt information to a user terminal of the first user account. As shown in FIG. 1B, assuming that the first user account is the user account C, the back-end server 20a pushes the image update prompt information to the user terminal 10c logged in with the user account C.

In the embodiments of this disclosure, an example where one user terminal corresponds to one user account is described. In practice, one user terminal may log in to one or more user accounts, and one user account may log in to one or more user terminals.

All of the user terminal 10b, the user terminal 10c, and the user terminal 10d in FIG. 1B can transmit images, obtain object following prompt information, obtain display object data, and receive image update prompt information, and so on. The above description made using one user terminal is merely an example.

Figure 1C:
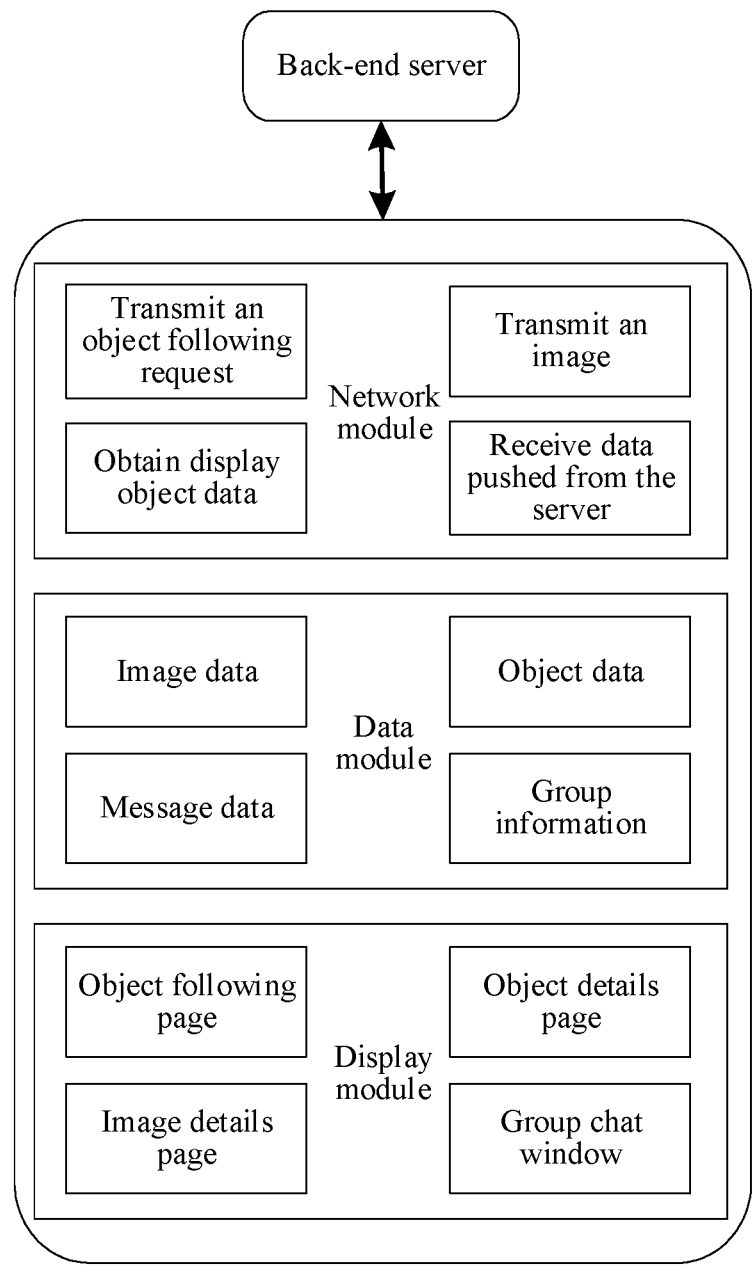
FIG. 1C is a schematic structural diagram of a user terminal according to an embodiment of this disclosure.

The above processes of FIG. 1A and FIG. 1B can be understood by further referring to FIG. 1C. FIG. 1C is a schematic structural diagram of a user terminal according to an embodiment of this disclosure. As shown in FIG. 1C, the user terminals in FIG. 1A and FIG. 1B (including the user terminal 10b, the user terminal 10c, and the user terminal 10d) each include three modules, namely, a network module, a data module, and a display module. Functions of the modules are as follows.

The network module is a module configured for communication between the user terminals and the back-end server (i.e., the server 10a in FIG. 1A and the back-end server 20a in FIG. 1B), including transmitting an object following request or transmitting an image to the back-end server, obtaining display object data, receiving object following prompt information or image update prompt information pushed by the back-end server, and so on. After receiving data, the user terminal updates the data to the data module. An underlying communication protocol of the network module is User Datagram Protocol (UDP). When the network module is not accessible, a prompt indicating a data transmission failure is displayed on the user terminal.

The data module mainly stores relevant data of the user terminal, which may be divided into the following three parts.

The first part is basic group information. The basic group information may include group member information and group chat information. The group member information may include member accounts, member nicknames or names, etc. The group chat information may include message data, chat time, etc.

The second part is image data, including an original image (e.g., the first image and the second image described in FIG. 1B), data indicating whether the image includes an object, etc.

The third part is object data, including an image including an object matching with a target display object, a first user account, a target user name, etc.

The data in the data module is stored in a memory cache and a local database. When the memory cache does not store data, the user terminal may load corresponding data in the local database and cache the corresponding data in the memory cache to improve the speed of obtaining data. After receiving data from the back-end server, the user terminal may update the memory cache and the local database at the same time.

The display module is responsible for displaying user interfaces (UIs) of the user terminal, and includes the following four parts.

The first part is an object following page, which may include a display object marking control, a selection control, a name input box, a scrolling list, etc. The above controls may be displayed by standard system controls and respond to user events.

The second part is an object details page (including a to-be-followed object details page, a transition object details page, and a followed object details page), which is used for target image displaying, original image list displaying, and so on, and uses standard system controls for displaying and responding to user events. The object details page includes a target display object, a target name, and a target image. The target image is a portion of a shared image that includes an object matching with the target display object (selected display object).

The third part is an image details page, including original image displaying, saving controls, prompt pop-ups, etc.

The fourth part is a group chat window, including a group name, a group message (session) list, an input box, etc. Such content is displayed by standard system controls.

In addition, the display module may further respond to user interaction operations, monitor click and drag events, and call back the operations or events to corresponding functions for processing. This process is supported by standard system controls with corresponding capabilities.

It may be understood that the method provided in the embodiments of this disclosure may be executed by a computer device, which includes but is not limited to a terminal or a server. The server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smartphone, a tablet computer, a notebook computer, a desktop computer, a smart speaker, a smartwatch, or the like, but is not limited thereto. The terminal and the server may be directly or indirectly connected in a wired or wireless communication manner. This is not limited in this disclosure.

The server 10a, the user terminal 10b, the user terminal 10c, and the user terminal 10d in FIG. 1A may include a mobile phone, a tablet computer, a notebook computer, a palmtop computer, a smart speaker, a mobile Internet device (MID), a point of sale (POS) machine, a wearable device (for example, a smart watch or a smart bracelet), and the like.

Figure 2A:
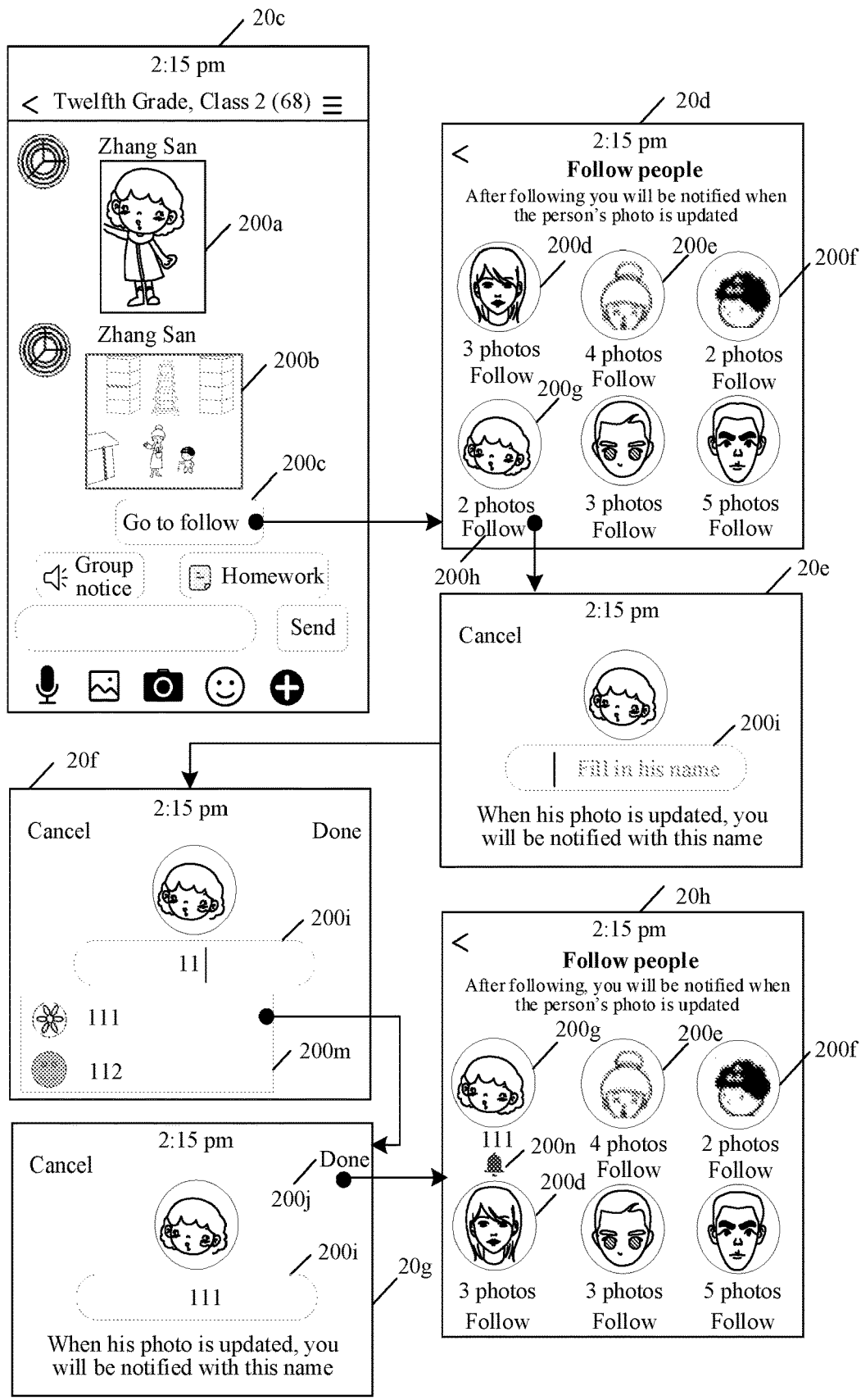
FIG. 2A is a schematic diagram of an image processing scenario according to an embodiment of this disclosure.

The following description is given using an example of following a face in a portrait image. FIG. 2A is a schematic diagram of an image processing scenario according to an embodiment of this disclosure. As shown in FIG. 2A, the group name of the communication group is "Twelfth Grade, Class 2", and there are 68 user accounts (corresponding to 68 users) in the group. The following description takes the back-end server 20a and the user terminal cluster in FIG. 1B as an example. Assume that the user terminal 10b is a transmitting terminal that transmits a first image, the user b is a transmitting user, and the user terminal 10c is a receiving terminal that receives the first image through the group "Twelfth Grade, Class 2" shown in FIG. 2A. In this case, the user account C is a local user account, and the user c is a receiving user.

As shown in a group session page 20c, the user b (i.e., Zhang San) transmits a first image 200a and a first image 200b to the group "Twelfth Grade, Class 2" at 2:15 pm through the user terminal 10b. The back-end server 20a first receives the first image 200a and the first image 200b, and then calls a face detection module (i.e., the object detection module described in FIG. 1B) to perform face detection on the first image 200a and the first image 200b, and detects that the first image 200a and the first image 200b contain a face. Therefore, while transmitting the first image 200a and the first image 200b to the user terminal 10c through the group "Twelfth Grade, Class 2", the back-end server 20a also transmits object following prompt information to the user terminal 10c. The object following prompt information is, for example, "Go to follow" 200c shown on the group session page 20c. The user c may click "Go to follow" 200c through the user terminal 10c, and the user terminal 10c displays an object following page 20d. The object following page 20d may include a face image 200g in the first image 200a, and a face image 200e and a face image 200f in the first image 200b. A face image 200d displayed on the object following page 20d may be a face image in other portrait images not displayed on the group session page 20c, or may be a face image in portrait images previously transmitted by other transmitting terminals. The same is true for other face images displayed on the object following page 20d. The face images (including the face image 200g, the face image 200e, the face image 200f, and the face image 200d) are all obtained by the back-end server 20a by detecting faces in the portrait images (including the first image).

Referring to FIG. 2A again, the user c may click on a following setting control (i.e., a follow control 200h) in the object following page 20d. Then, the user terminal 10c displays a name setting page 20e in FIG. 2A in response to a trigger operation performed on a target following setting control in the object following page 20d. The name setting page 20e includes a display object corresponding to the follow control 200h (i.e., the face image 200g, where in this case the face image 200g is a target display object), and a name input control 200i. As shown in FIG. 2A, the name setting page 20e also displays a prompt "When his photo is updated, you will be notified with this name" to prompt the user c to fill in a target name for the face image 200g. The user c clicks the name input control 200i to input a name for the face image 200g. During the process of the user c inputting the name, the user terminal 10c matches information inputted by the user c against existing friend names of the user account C in a memory cache or a local database. If there is an associated name matching with the information, an associated name list 200m is displayed. As shown in a name setting page 20f, the target name (selected name) is "111", when the user c inputs "11" in the name input control 200i, the user terminal 10c may provide the user c with two friend names associated with "11", which are "111" and "112". Because "111" has hit the target name, the user c does not need to input any more information, and can click "111" in the associated name list 200m to directly determine the target name, as shown in a name setting page 20g. If there is no associated name matching with the information, the user c fills in the target name normally. After filling in the target name, the user c clicks a completion control 200j on the name setting page 20g. In this case, the user terminal 10c transmits an object following request to the back-end server 20a in response to the trigger operation performed on the completion control 200j. The object following request carries the local user account (i.e., the user account C), the target name (i.e., "111"), and the face image 200g, so that the back-end server 20a creates a face following relationship according to the object following request, the local user account, the target name, and the face image 200g.

As shown in FIG. 2A, after the back-end server 20a successfully creates the face following relationship, the corresponding display of the user terminal 10c may jump to (display) an object following page 20h. A following setting control 200h in the object following page 20d is used for instructing the user c to follow the face image 200g, and a following setting control 200n in the object following page 20h is used for indicating that the user c has successfully followed the face image 200g.

In addition, the back-end server 20a may store the face following relationship, the local user account, the target name, and the face image 200g as object following data in the storage server 20b in FIG. 1B.

Figure 2B:
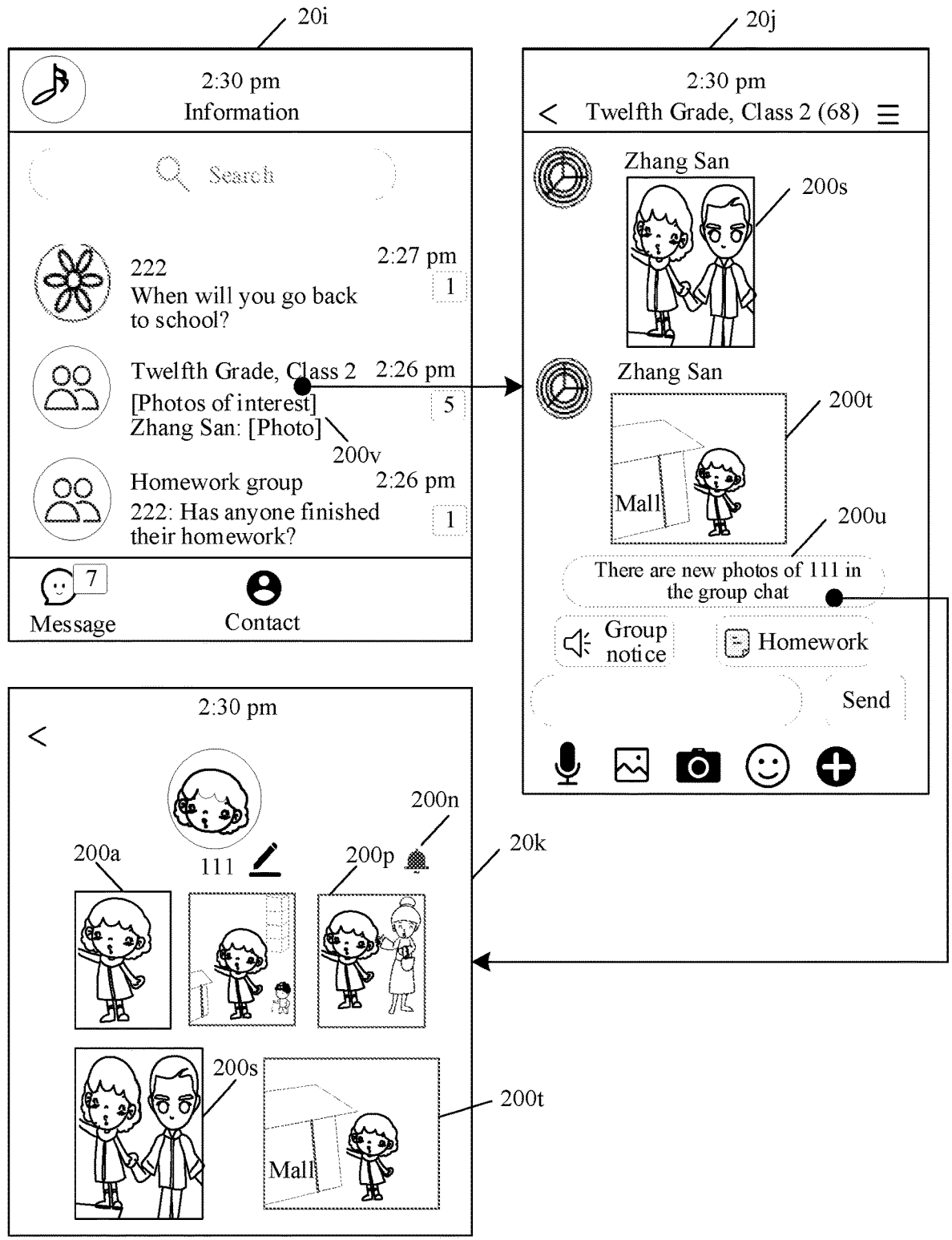
FIG. 2B is a schematic diagram of an image processing scenario according to an embodiment of this disclosure.

FIG. 2B is a schematic diagram of an image processing scenario according to an embodiment of this disclosure. The following description still takes the user terminal cluster in FIG. 1B as an example. The user terminal 10b is a transmitting terminal that transmits a second image, the user b is a transmitting user, the user account B is a transmitting user account, the user terminal 10c is a receiving terminal that receives the second image through the group "Twelfth Grade, Class 2" as shown in FIG. 2B, the user c is a receiving user, and the user account C is a receiving user account.

When the user b transmits a second image 200s and a second image 200t to the group "Twelfth Grade, Class 2", the back-end server 20a calls the face detection module to perform face detection on the second image 200s and the second image 200t, and detects that both the second image 200s and the second image 200t include a face image, and include an object matching with the target display object (e.g., the face image 200g) in FIG. 2A. In this case, the back-end server 20a may obtain object following data from the local database or the storage server 20b in FIG. 1B according to the face image 200g, and then determine a first user account (i.e., the user account C) that has an object following relationship with the face image 200g from the object following data. According to the second image 200s and the second image 200t, the back-end server 20a generates first prompt information 200v and second prompt information 200u associated with the target name. While transmitting the second image 200s and the second image 200t to the user terminal 10c according to the group "Twelfth Grade, Class 2", the back-end server 20a also transmits the first prompt information 200v and the second prompt information 200u to the user terminal 10c.

Referring to FIG. 2B again, the user b transmits the second image 200s and the second image 200t to the group "Twelfth Grade, Class 2" at 2:26 pm, and the user c opens a user interaction page 20i on the user terminal 10c at 2:30 pm. As shown in FIG. 2B, the user interaction page 20i may include an interaction area for displaying the first prompt information 200v, and the first prompt information 200v may be "Photos of interest" to prompt the user C that a portrait image matching the face that the user C follows is shared in the group "Twelfth Grade, Class 2". When the user C clicks the interaction area, the corresponding display of the user terminal 10c displays a group session page 20j. The group session page 20j includes the second image 200s, the second image 200t, and the second prompt information 200u. The second prompt information 200u may be "There is a new photo of 111 in the group chat". If the user C clicks the second prompt information 200u, as shown in FIG. 2B, the corresponding display of the user terminal 10c displays a target object details page 20k. In addition to the first image 200a in FIG. 2A, the target object details page 20k also includes other portrait images associated with the target display object, such as the second image 200s, the second image 200t, and a portrait image 200p. The portrait image 200p may be a portrait image not displayed on the group session page 20j, or may be a portrait image previously transmitted by another transmitting terminal. The same is true for other portrait images. The portrait images displayed on the target object details page 20k are all provided by the back-end server 20a.

It can be seen from the above that according to this embodiment of this disclosure, a user can follow a face in a portrait image in a communication application, and, when another user shares a portrait image with the followed face in the communication application, a corresponding user account of the user will receive image update prompt information, which prompts the user to view photos of the face that the user follows.

Figure 3:
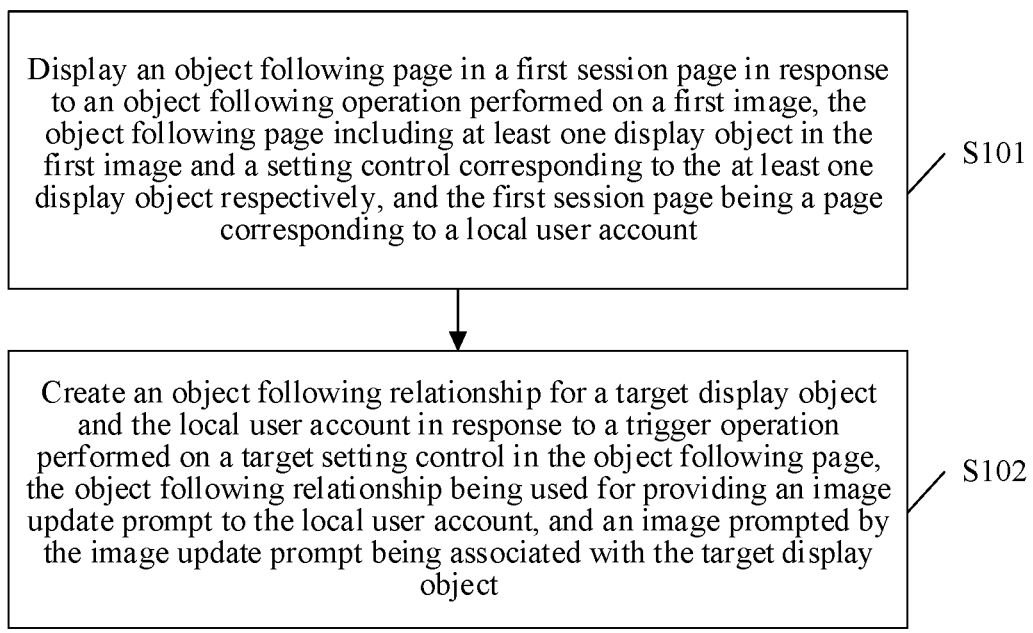
FIG. 3 is a schematic flowchart of an image processing method according to an embodiment of this disclosure.

Further, FIG. 3 is a schematic flowchart of an image processing method according to an embodiment of this disclosure. As shown in FIG. 3, the image processing method includes the following steps.

In Step S101, an object following page is displayed in a first session page in response to an object following operation performed on a first image, the object following page including at least one display object in the first image and a setting control corresponding to the at least one display object respectively, and the first session page being a page corresponding to a local user account.

Specifically, a user terminal displays the first image and object following prompt information for the first image in the first session page; and displays the object following page in response to a trigger operation performed on the object following prompt information.

In an implementation, the first image is displayed in the first session page, and the object following page is displayed in response to a trigger operation performed on the first image, the object following page including the first image and an object following area, and the object following area including the at least one display object in the first image.

This embodiment of this disclosure is described by taking the user terminal 10c in FIG. 1B as the execution entity as an example, and it is assumed that the user c is a receiving user, and the user account C is a receiving user account, that is, a local user account. Referring to FIG. 2A again, through a group "Twelfth Grade, Class 2", the user terminal 10c logged in with the user account C obtains a first image 200a and a first image 200b, as shown in a group session page 20c (i.e., the first session page). When there is a face that user c does not follow, and a user in the group has shared a portrait photo, the user c may be asked in the information flow and guided to follow the face. Therefore, in addition to displaying the first image 200a and the first image 200b, the user terminal 10c also displays the object following prompt information, that is, "Go to follow" 200c. The object following prompt information may be generated by a server according to face data in the first image 200a and the first image 200b, or may be generated by the user terminal 10c according to face data in the first image 200a and the first image 200b that is determined by and transmitted from a server, which is not limited herein.

The user c clicks "Go to follow" 200c on the group session page 20c, and the user terminal 10c jumps to an object following page 20d in response to the operation.

Figure 4:
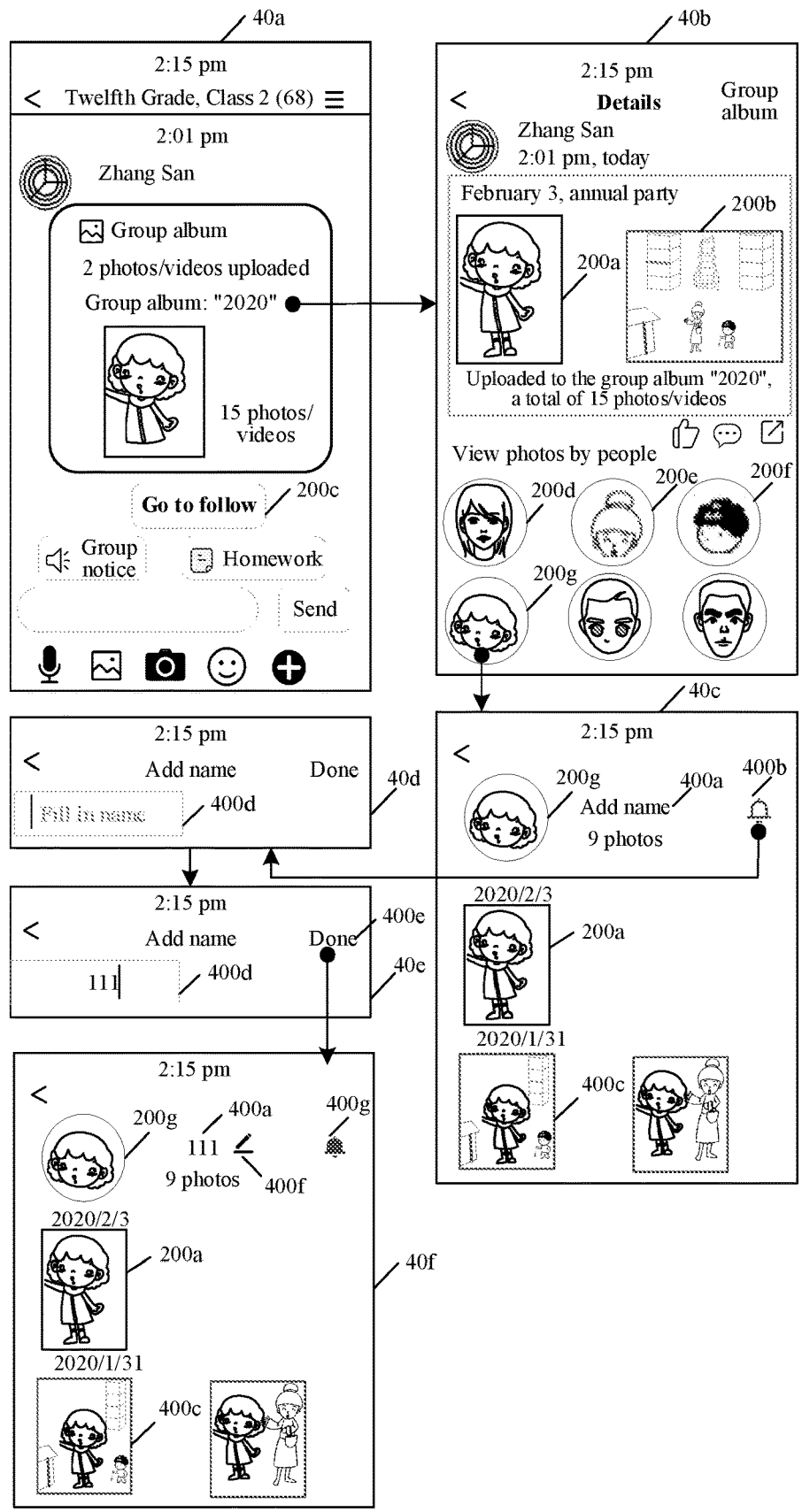
FIG. 4 is a schematic diagram of an image processing scenario according to an embodiment of this disclosure.

It can be understood that in FIG. 2A, a user "Zhang San" transmits the first image to the group "Twelfth Grade, Class 2" in the form of group dynamics. In addition, the user "Zhang San" may also share the first image through a group album of the group "Twelfth Grade, Class 2". FIG. 4 is a schematic diagram of an image processing scenario according to an embodiment of this disclosure. As shown in FIG. 4, the user "Zhang San" uploaded the first image 200a and the first image 200b to the group album "2020" in the group "Twelfth Grade, Class 2" at 2:01 pm, and the user c opened the first session page (i.e., a group session page 40a) of the user terminal 10c at 2:15 pm. The group session page 40a includes the group album "2020" and the object following prompt information (i.e., "Go to follow" 200c). The user c may directly click on the group album "2020", and the corresponding display of the user terminal 10c displays an object following page 40b. Different from the object following page 20d in FIG. 2A, the object following page 40b includes the first image 200a and the first image 200b transmitted by the user "Zhang San" at 2:01 pm. When uploading the first image 200a and the first image 200b through the transmitting terminal, the user "Zhang San" may also set a topic for the first image 200a and the first image 200b, e.g., "February 3, annual party" shown on the object following page 40b. Meanwhile, the object following page 40b further includes face images recognized by the server according to the group album "2020", such as face image 200d, face image 200e, face image 200f, face image 200g, and other face images.

In Step S102, an object following relationship is created between a target display object (selected display object) and the local user account in response to a trigger operation performed on a target setting control in the object following page, the object following relationship providing an image update prompt to the local user account, and an image prompted by the image update prompt being associated with the target display object.

Specifically, the object following page includes a following setting control. The user terminal displays a name setting page in response to a trigger operation performed on a target following setting control in the object following page. The name setting page including the target display object corresponding to the target following setting control. The user terminal outputs an associated name list independently displayed on the name setting page in response to a name input operation performed on the name setting page, and displays the name setting page including the target display object marked with the target name in response to a trigger operation performed on a target name in the associated name list. The name setting page including a second confirmation control. The user terminal transmits an object following request to a server in response to a trigger operation performed on the second confirmation control, so that the server creates the object following relationship for the target display object, the target name, and the local user account according to the object following request, the object following request carrying the local user account, the target name, and the target display object.

In an implementation, the user terminal displays a to-be-followed object details page in response to a trigger operation performed on the target setting control in the object following area, the to-be-followed object details page including an object name control, an object following control in a non-followed state, and the target display object. The user terminal displays a name setting page in response to a trigger operation performed on the object following control in the non-followed state. The user terminal displays the name setting page in which a target name has been inputted, in response to a name input operation performed on the name setting page. The name setting page includes a first confirmation control. The user terminal displays a followed object details page in response to a trigger operation performed on the first confirmation control. The followed object details page includes the object name control carrying the target name, the object following control in a followed state, and the target display object. The object following control in the followed state is used for representing that the object following relationship has been created between the target display object and the local user account.

Referring to FIG. 2A again, the user c may click on a following setting control (i.e., a follow control 200h) in the object following page 20d. Then, the user terminal 10c displays a name setting page 20e in FIG. 2A in response to a trigger operation performed on a target following setting control (i.e., in response to the click on the follow control 200h) in the object following page 20d. The name setting page 20e includes a display object corresponding to the follow control 200h (i.e., the face image 200g), and a name input control 200i. As shown in FIG. 2A, the name setting page 20e also displays a prompt "When his photo is updated, you will be notified with this name" to prompt the user c to fill in a target name for the face image 200g. The user c clicks the name input control 200i to input a name for the face image 200g. During the process of the user c inputting the name, the user terminal 10c matches information inputted by the user c against existing friend names of the user account C in a memory cache or a local database. If there is an associated name matching with the information, an associated name list 200m is displayed. As shown in a name setting page 20f, the target name is "111", when the user c inputs "11" in the name input control 200i, the user terminal 10c may provide the user c with two friend names associated with "11", which are "111" and "112". Because "111" has hit the target name, the user c does not need to input any more information, and can click "111" in the associated name list 200m to directly determine the target name, as shown in a name setting page 20g. If there is no associated name matching with the information, the user c fills in the target name normally. After filling in the target name, the user c clicks a completion control 200j on the name setting page 20g. In this case, the user terminal 10c transmits an object following request to the back-end server 20a in response to the trigger operation performed on the completion control 200j. The object following request carries the local user account (i.e., the user account C), the target name (i.e., "111"), and the face image 200g, so that the back-end server 20a creates a face following relationship according to the object following request, the local user account, the target name, and the face image 200g.

After the back-end server 20a has successfully created a face following relationship for the local user account, the target name, and the face image 200g, the user terminal 10c displays the object following page 20h. As shown in FIG. 2A, after the user c follows the portrait image 200g, the user terminal 10c may place the portrait image 200g on the top of the object following page 20h.

Referring to FIG. 4 again, it can be seen from the above that the object following page 40b includes the face image 200d, the face image 200e, the face image 200f, the face image 200g, and other face images. It can be understood that each of the face images is provided with a setting control. When the user c clicks on the face image 200g (i.e., the target setting control), the user terminal 10c may be caused to display a to-be-followed object details page 40c associated with the face image 200g. The to-be-followed object details page 40c includes an object name control 400a, an object following control 400b in a non-followed state, and the target display object (i.e., the face image 200g), and also includes a portrait image matching with the face image 200g in the group album "2020", for example, the first image 200a and the portrait image 400c. The object following control 400b in the non-followed state may indicate that the portrait image 200g has not been followed by a user in the group "Twelfth Grade, Class 2", or has not been followed by the user c. This disclosure is not limited to the above two cases, and other cases may be set according to practical application scenarios.

For the user c to follow a face, the face needs to have a name. Therefore, when the user c clicks the object following control 400b in the non-followed state, the user terminal 10c displays a name setting page 40d. As shown in FIG. 4, the name setting page 40d includes a name input control 400d for the user c to input a target name (selected name) for the portrait image 200g. After the user c inputs "111" (i.e., the target name) in the name setting page 40e and clicks the first confirmation control (i.e., a completion control 400e) in the page, the user terminal 10c displays a followed object details page 40f. As shown in FIG. 4, the followed object details page 40f includes an object name control 400a carrying a target name ("111"), an object following control 400g in a followed state, and a target display object (i.e., a face image 200g). Compared with the object following control 400b in the non-followed state, it can be seen that the object following control 400g in the followed state may represent that the object following relationship has been created between the target display object and the local user account.

In an implementation, referring to FIG. 4 again, the followed object details page 40f includes a modification control 400f. If the user c wants to modify the target name for the face image 200g, the user c may click the modification control 400f, and in this case, the corresponding display of the user terminal 10c may switch to displaying the name setting page 40e. If the user c deletes the target name in the name input control 400d in the name setting page 40e, inputs a new name in the name input control 400d, and then clicks the completion control 400e, the user terminal 10c transmits an object following update request to the back-end server 20a. The object following update request carries the local user account, the new name, and the target display object. After obtaining the object following update request, the back-end server 20a removes the object following relationship between the local user account, the target name, and the target display object, and creates a new update object following relationship for the local user account, the update name, and the target display object. Subsequent steps are the same as those described above, so the details will not be repeated here.

In this embodiment of this disclosure, an object following page may be displayed in a first session page in response to an object following operation performed on a first image. The object following page includes at least one display object in the first image and a setting control corresponding to the at least one display object respectively. The first session page is a page corresponding to a current user terminal, and a user account used by the current user terminal to log in to the communication application is a local user account. In response to a trigger operation performed on a target setting control in the object following page, because the display objects correspond one-to-one to the setting controls, the target display object corresponding to the target setting control may be determined, and further, an object following relationship may be created for the target display object and the local user account. Subsequently, if a new image is obtained and the new image is associated with the target display object, an image update prompt may be provided to the local user account according to the object following relationship. It can be seen from the above that according to this embodiment of this disclosure, the user may perform an object following operation on the target display object (for example, a portrait of the user or an object of interest to the user) in the first image, and when other user accounts share second images associated with the target display object, the user receives an update prompt for these images. In this way, the user can view images related to the user. Because the images that are not related to the user can be filtered out, the efficiency of message viewing can be improved.

Figure 5A:
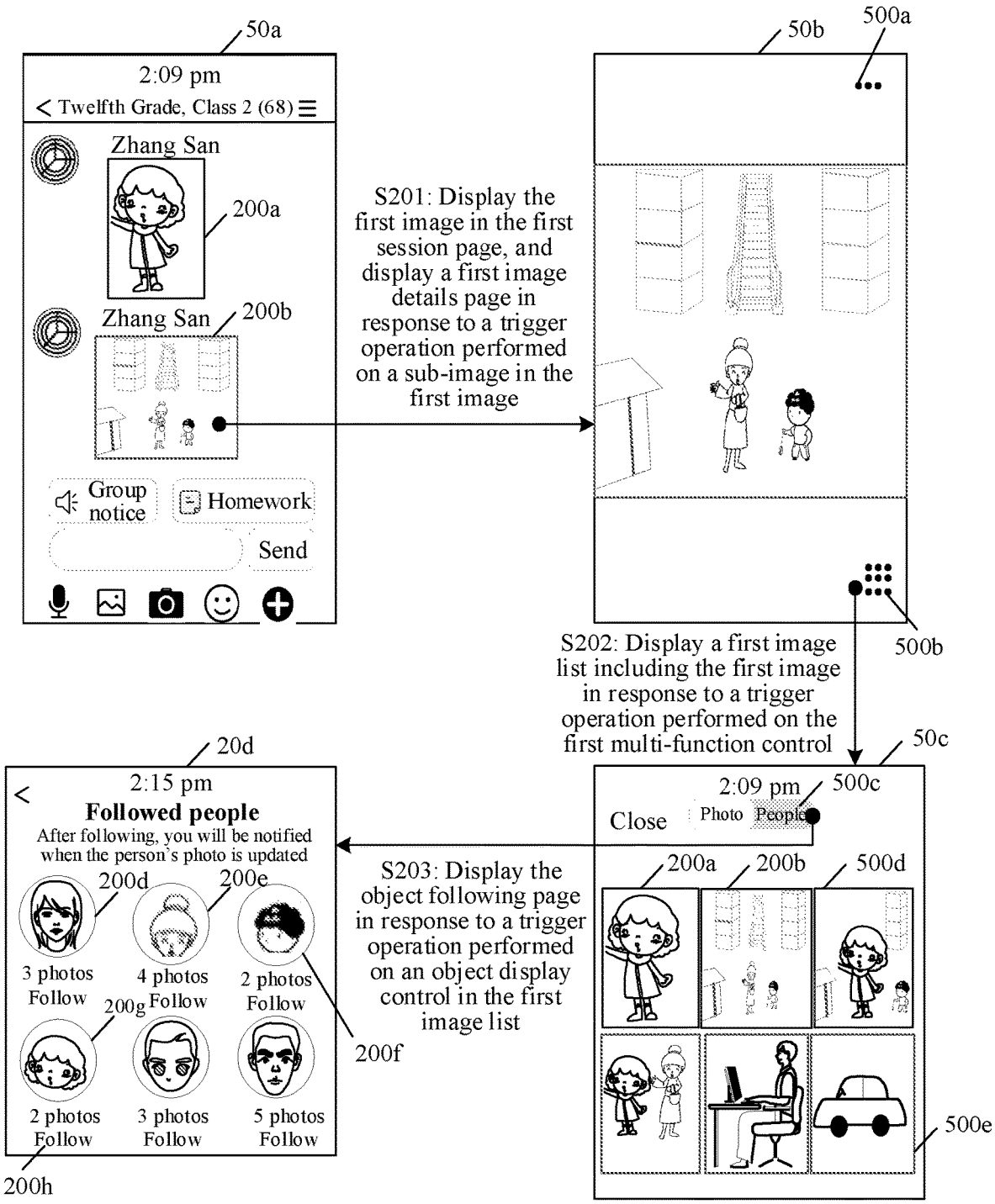
FIG. 5A and FIG. 5B are schematic diagrams of an interface of displaying an object following page according to an embodiment of this disclosure.
Figure 5B:
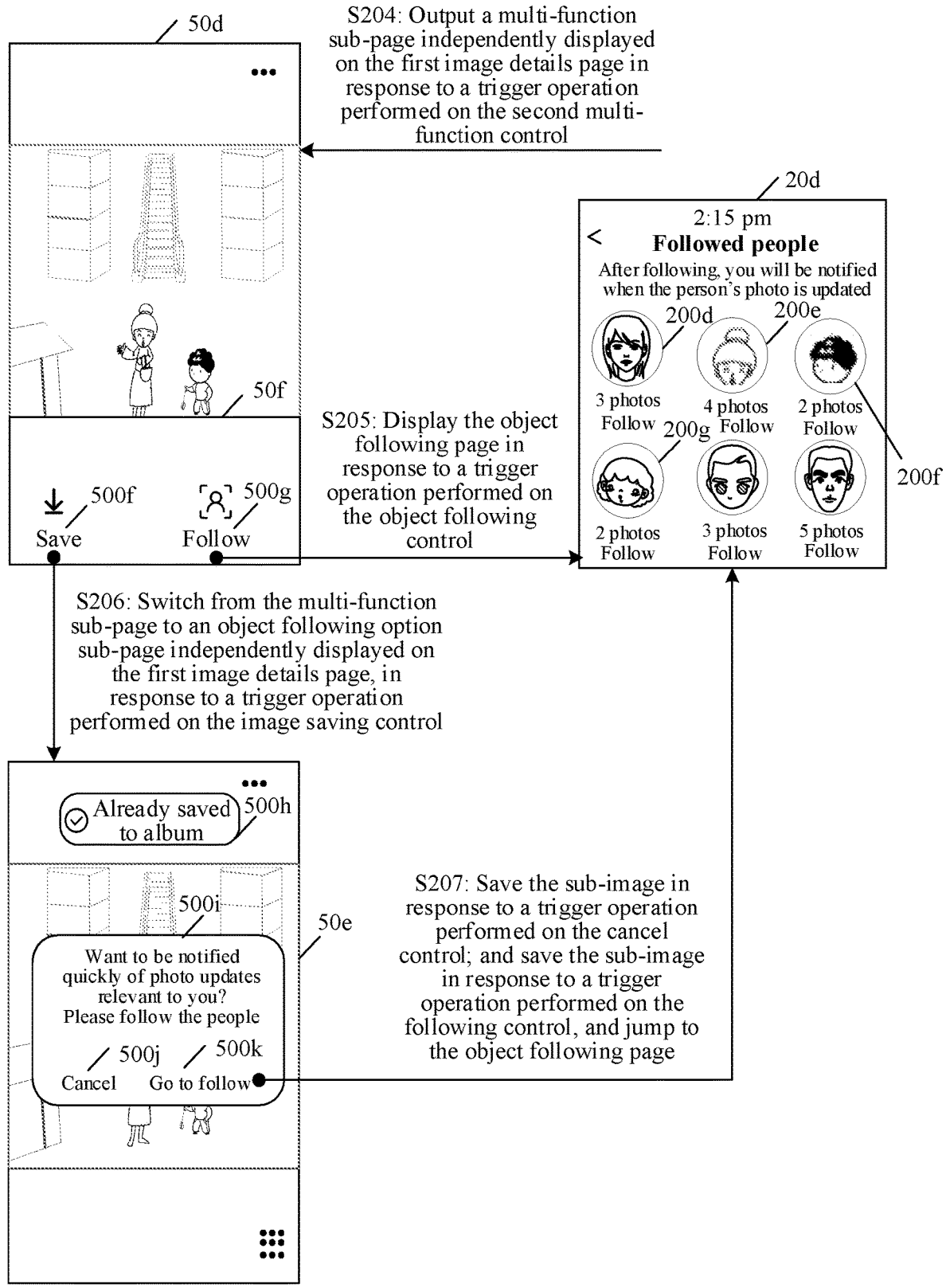

Further, FIG. 5A and FIG. 5B are schematic diagrams of an interface of displaying an object following page according to an embodiment of this disclosure. As shown in FIG. 5A to FIG. 5B, step S201 to step S207 may be considered as a specific description of step S101 in the embodiment corresponding to FIG. 3 above. That is, step S201 to step S207 are a specific process of responding to an object following operation performed on the first image according to an embodiment of this disclosure.

As shown in FIG. 5A to FIG. 5B, the response to an object following operation performed on the first image may include the following steps.

In step S201, the first image is displayed in the first session page, and a first image details page is displayed in response to a trigger operation performed on a sub-image in the first image.

Specifically, the first image details page includes the sub-image, a first multi-function control, and a second multi-function control.

In the embodiment corresponding to FIG. 2A, a system message is used to guide the user c to follow a face in a portrait image in the group "Twelfth Grade, Class 2". However, in the embodiments of this disclosure, a fixed path for viewing portrait images may be provided. As shown in FIG. 5A, the user c opens a communication application of the user terminal 10c to display a group session page 50 a (i.e., the first session page). The group session page 50a includes a first image 200a and a first image 200b obtained by the user terminal 10c, but does not include the object following prompt information in the group session page 20c in FIG. 2A, that is, "Go to follow" 200c. However, the user terminal 10c may still display the object following page 20d. A specific process is as follows: The user c clicks the first image 200b (clicking the first image 200a and clicking the first image 200b, the subsequent process is the same), and the user terminal 10c displays the first image details page, that is, an image details page 50b in FIG. 5A. In the group session page 50a, the first image 200b is displayed in the form of a thumbnail, and in the image details page 50b, the first image 200b is displayed in the form of the original image, where its content remains unchanged, and only the display scale of the image changes.

In Step S202, a first image list including the first image is displayed in response to a trigger operation performed on the first multi-function control.

Specifically, referring to FIG. 5A again, the image details page 50b includes a first multi-function control 500a and a second multi-function control 500b. If the user c clicks on the first multi-function control 500a, the corresponding display of the user terminal 10c displays the first image list, i.e., an image list 50c in FIG. 5A. The image list 50c includes the first image 200a and the first image 200b transmitted by the transmitting terminal, and also includes images shared previously in the group "Twelfth Grade, Class 2" (where the images do not include only portrait images, but include all images), for example, images 500e and 500d.

In Step S203, the object following page is displayed in response to a trigger operation performed on an object display control in the first image list.

Specifically, the image list 50c includes an object display control, i.e., a "People" control 500c in FIG. 5A. If the user c clicks on the "People" control 500c, as shown in FIG. 5A, the user terminal 10c will display the object following page 20d.

In Step S204, a multi-function sub-page is independently displayed on the first image details page in response to a trigger operation performed on the second multi-function control.

Specifically, the multi-function sub-page includes an object following control and an image saving control.

If the user c clicks on the second multi-function control 500b in the image details page 50b in FIG. 5A, the user terminal 10c responds to the trigger operation performed on the second multi-function control 500b. As shown in FIG. 5B, the corresponding display of the user terminal 10c outputs a multi-function sub-page 50f independently displayed on the image details page 50b. The multi-function sub-page 50f includes an object following control (i.e., a follow control 500g in FIG. 5B), and an image saving control (i.e., a save control 500f in FIG. 5B)

In Step S205, the object following page is displayed in response to a trigger operation performed on the object following control.

Specifically, When the user terminal 10c responds to the trigger operation performed on the follow control 500g, the object following page 20d is displayed.

In Step S206, the displayed page is switched from the multi-function sub-page to an object following option sub-page independently displayed on the first image details page, in response to a trigger operation performed on the image saving control.

Specifically, the object following option sub-page includes a cancel control and a follow control.

Referring to FIG. 5B again, if the user c clicks the save control 500f, the user terminal 10c switches from the multi-function sub-page 50f to an object following option sub-page 500i independently displayed on the image details page 50b. As shown in FIG. 5B, the object following option sub-page 500i is used to prompt the user c to follow the face image in the object following page 20d. In this embodiment of this disclosure, a prompt "Want to be notified quickly of photo updates relevant to you? Please follow the people" is used as an example. The object following option sub-page 500i may include a cancel control 500j and a follow control (i.e., "Go to follow" control 500k in FIG. 5B).

In Step S207, the sub-image is saved in response to a trigger operation performed on the cancel control. The sub-image is saved in response to a trigger operation performed on the follow control, and the object following page is jumped to.

Specifically, if the user c clicks the cancel control 500j, the user terminal 10c only saves the image displayed on the image details page 50b, that is, the first image 200b. If the user c clicks the "Go to follow" control 500k, the user terminal 10c not only saves the first image 200b to a local album, but also jumps from the current page to the object following page 20d, as shown in FIG. 5B. When the user terminal 10c has successfully saved the first image 200b, the image details page 50b may display a prompt regarding the saving of the image, e.g., a prompt "Already saved to album" 500h in FIG. 5B.

In this embodiment of this disclosure, an object following page may be displayed in a first session page in response to an object following operation performed on a first image. The object following page includes at least one display object in the first image and a setting control corresponding to the at least one display object respectively. The first session page is a page corresponding to a current user terminal, and a user account used by the current user terminal to log in to the communication application is a local user account. In response to a trigger operation performed on a target setting control in the object following page, because the display objects correspond one-to-one to the setting controls, the target display object corresponding to the target setting control may be determined, and further, an object following relationship may be created for the target display object and the local user account. Subsequently, if a new image is obtained and the new image is associated with the target display object, an image update prompt may be provided to the local user account according to the object following relationship. It can be seen from the above that according to this embodiment of this disclosure, the user may perform an object following operation on the target display object (for example, a portrait of the user or an object of interest to the user) in the first image, and when other user accounts share second images associated with the target display object, the user receives an update prompt for these images. In this way, the user can view images related to the user. Because the images that are not related to the user can be filtered out, the efficiency of message viewing can be improved.

Figure 6A:
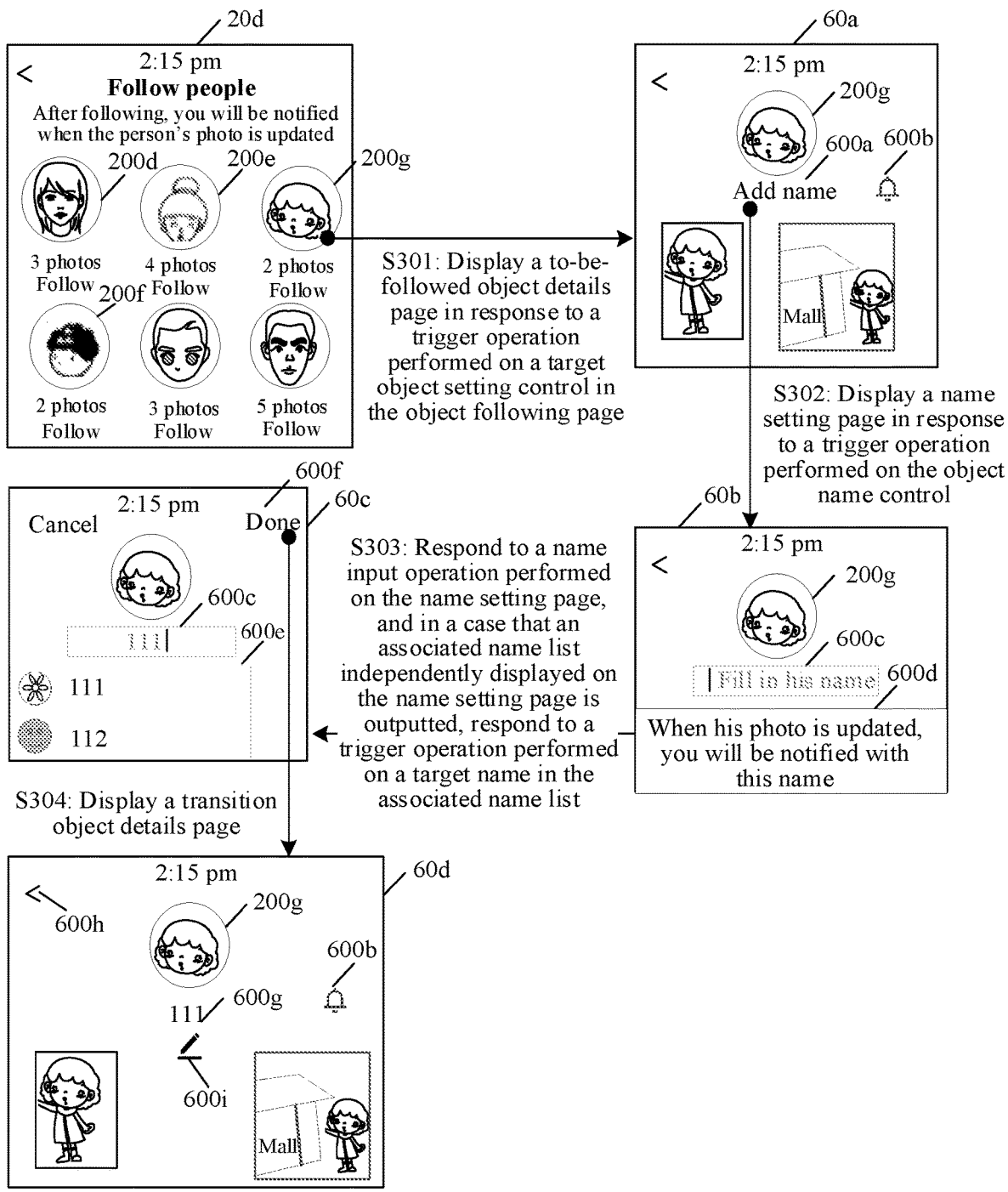
FIG. 6A and FIG. 6B are schematic diagrams of an interface of creating an object following relationship for a target display object and a local user account according to an embodiment of this disclosure.
Figure 6B:
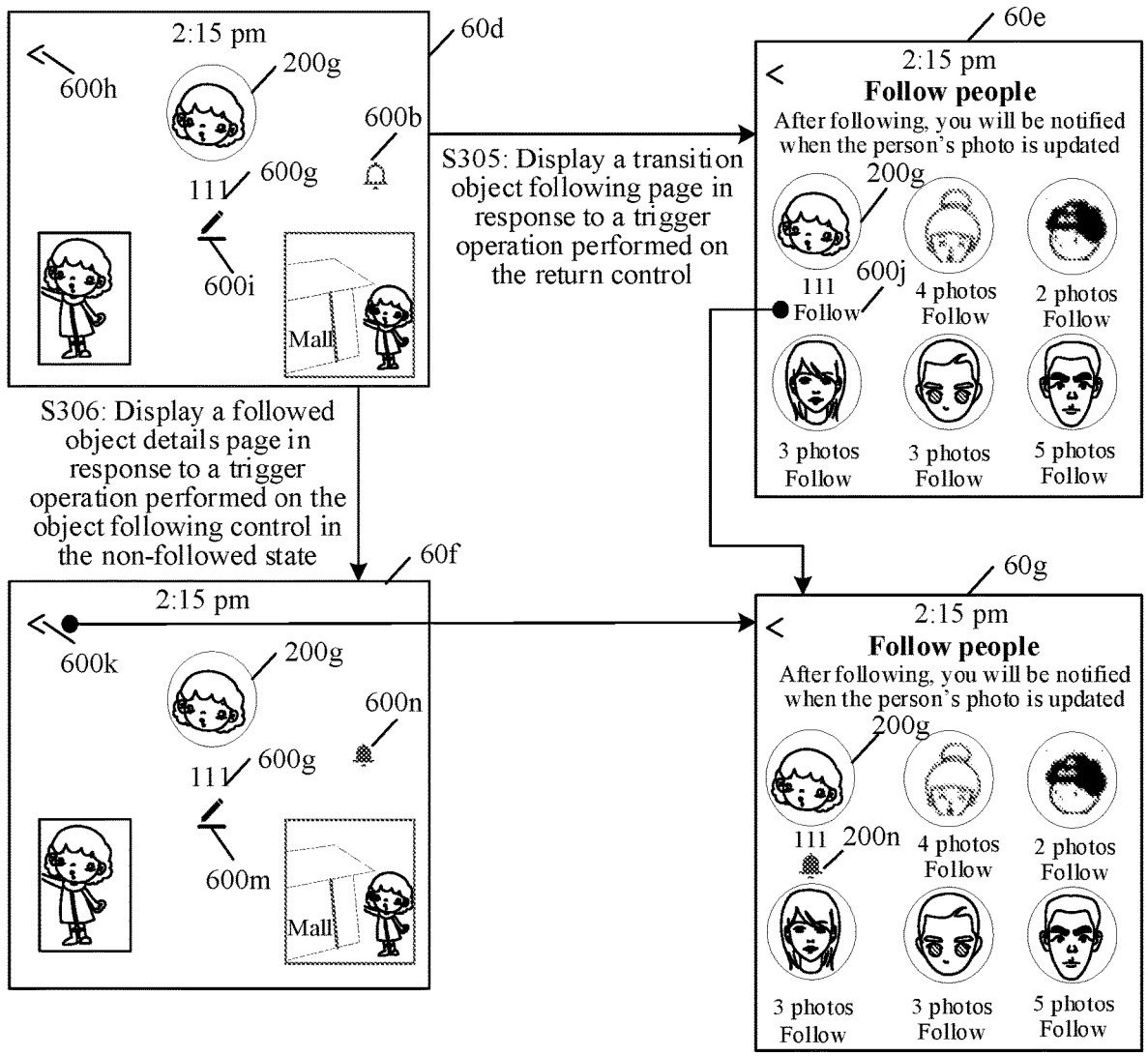

Further, FIG. 6A and FIG. 6B are schematic diagrams of an interface of creating an object following relationship for a target display object and a local user account according to an embodiment of this disclosure. As shown in FIG. 6A to FIG. 6B, step S301 to step S306 may be considered as a specific description of step S102 in the embodiment corresponding to FIG. 3 above. That is, step S301 to step S306 are a specific process of responding to a trigger operation performed on a target setting control in the object following page according to an embodiment of this disclosure.

As shown in FIG. 6A to FIG. 6B, the response to a trigger operation performed on a target setting control in the object following page may include the following steps.

In Step S301, a to-be-followed object details page is displayed in response to a trigger operation performed on a target object setting control in the object following page.

Specifically, referring to FIG. 6A again, the face image 200g on the object following page 20d carries an object setting control. When the user c clicks on the face image 200g, the user terminal 10c responds to the trigger operation performed on the target object setting control.

As shown in FIG. 6A, a to-be-followed object details page 60a includes an object name control 600a, an object following control 600b in a non-followed state, and the target display object (i.e., the face image 200g).

In Step S302, a name setting page is displayed in response to a trigger operation performed on the object name control.

Specifically, the premise for the user c to follow the face image 200g is to make notes on the face, that is, the face needs to have a name. For example, the object name control 600a in the name setting page 60a prompts the user c to add a name for the face image 200g. The user terminal 10c displays the name setting page 60b in response to a trigger operation performed on the object name control 600a.

In Step S303, a name input operation performed on the name setting page is received, and in a case that an associated name list independently displayed on the name setting page is outputted, respond to a trigger operation performed on a target name in the associated name list is received.

Specifically, the user c clicks the name input control 600c in the name setting page 60b to input a name for the face image 200g. During the process of inputting the name, the user terminal 10c matches information inputted by the user c against existing friend names of the user account C in a memory cache or a local database. If there is an associated name matching with the information, an associated name list 600e is displayed. As shown in a name setting page 60c, the target name is "111", when the user c inputs "11" in the name input control 600c, the user terminal 10c may provide the user c with two friend names associated with "11", which are "111" and "112". Because "111" has hit the target name, the user c does not need to input any more information, and can click "111" in the associated name list 600e to directly determine the target name, as shown in the name setting page 60c. If there is no associated name matching with the information, the user c fills in the target name normally.

In Step S304, a transition object details page is displayed.

Specifically, the transition object details page includes the object name control carrying the target name, the object following control in the non-followed state, and the target display object; and the transition object details page includes a return control.

After filling in the target name, the user c clicks a completion control 600f on the name setting page 60c. In this case, the user terminal 10c displays a transition object details page 60d in response to a trigger operation performed on the completion control 600f.

It can be understood that the premise for a user to follow a portrait is that the portrait has a name. However, the user may also view photos by portrait, and name the portrait but not follow the portrait. For example, a teacher may name portraits of students in a class, and may also view photos according to the names of the students, but the teacher does not necessarily follow the students.

In Step S305, a transition object following page is displayed in response to a trigger operation performed on the return control.

Specifically, the transition object following page includes the target display object marked with the target name, and a following setting control, and the following setting control is used for instructing create an object following relationship between the target display object and a user account (the local user account).

Referring to FIG. 6B again, the transition object details page 60d may include an object name control 600g carrying a target name (i.e., 111), an object following control 600b in a non-followed state, and a target display object. In addition, the transition object details page 60d includes a return control 600h.

In this case, the user c has added a name to but has not followed the face image 200g, so when the user c clicks the return control 600h, the user terminal 10c displays a transition object following page 60e. It can be seen from the transition object following page 60e that a name, i.e., 111, has been added to the face image 200g, and the name will be shared with other group users in the group "Twelfth Grade, Class 2", and other group users can directly click the following setting control (i.e., follow control 600j) to follow the face image 200g, without having to fill in a name for the face image 200g again, as shown in a followed object following page 60g.

In Step S306, a followed object details page is displayed in response to a trigger operation performed on the object following control in the non-followed state.

Specifically, the followed object details page includes the object name control carrying the target name, the object following control in a followed state, and the target display object. The object following control in the followed state is used for representing that the object following relationship has been created between the target display object and the local user account.

Referring to FIG. 6B again, the transition object details page 60d includes an object following control 600b in a non-followed state. When the user c clicks the object following control 600b in the non-followed state, the user terminal 10c transmits an object following request to the back-end server 20a. The object following request carries the local user account (i.e., the user account C), the target name (i.e., "111"), and the face image 200g, so that the back-end server 20a creates a face following relationship according to the object following request, the local user account, the target name, and the face image 200g. After the back-end server 20a has successfully created a face following relationship for the local user account, the target name, and the face image 200g, the user terminal 10c displays the followed object following page 60g. As shown in FIG. 6B, after the user c follows the portrait image 200g, the user terminal 10c may place the portrait image 200g on the top of the followed object following page 60g.

Figure 7:
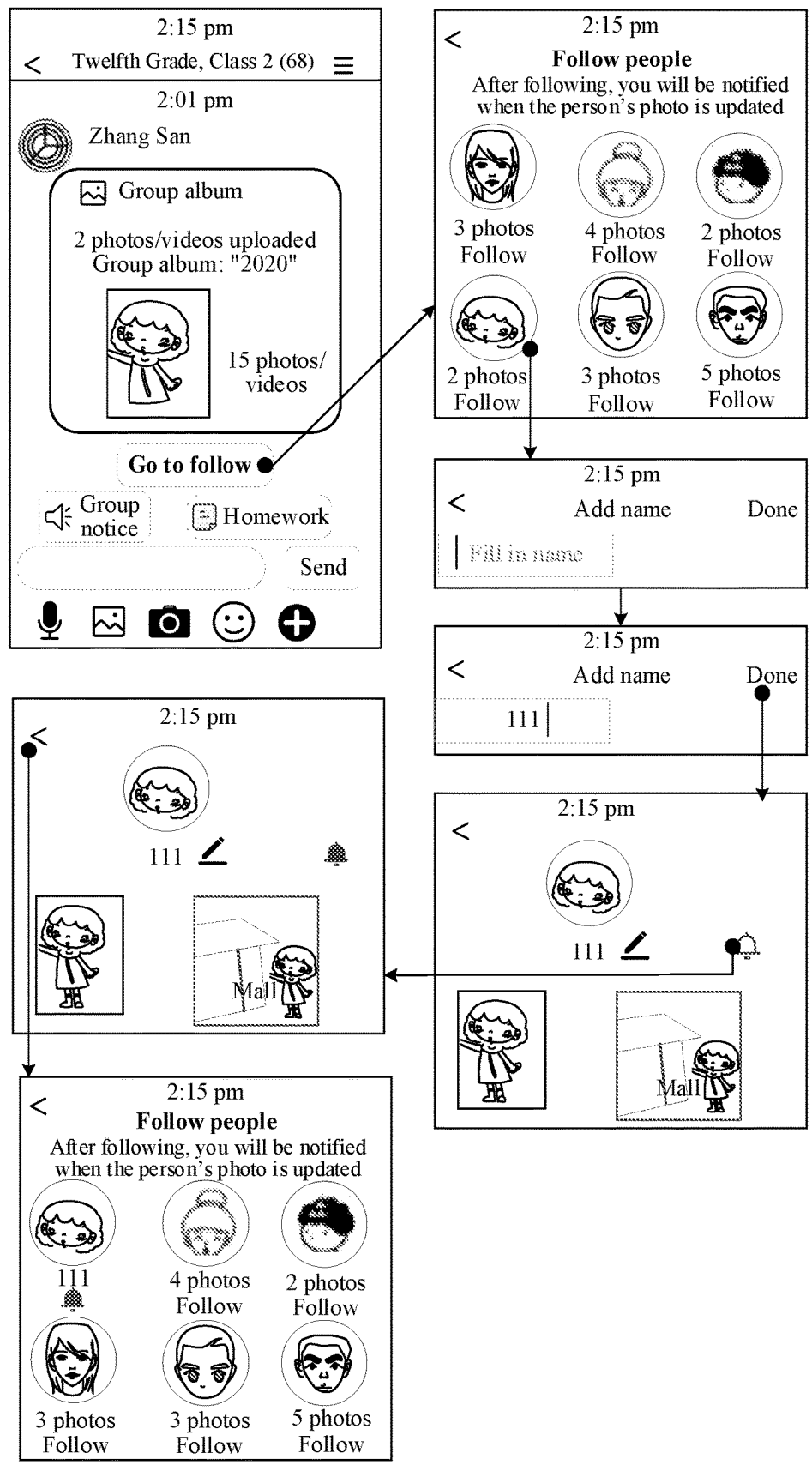
FIG. 7 is a schematic diagram of an image processing scenario according to an embodiment of this disclosure.

FIG. 7 is a schematic diagram of an image processing scenario according to an embodiment of this disclosure. In the embodiments of this disclosure, two forms of sending the first image are provided: sending the first image to the group "Twelfth Grade, Class 2" in the form of group dynamics, and sharing the first image through the group album in the group "Twelfth Grade, Class 2". In practice, other manners may also be adopted, which will not be enumerated herein. In the embodiments of this disclosure, two setting controls are provided on the object following page to create an object following relationship for the local user account and the target display object: one is the object setting control, and the other is the following setting control. FIG. 7 shows a processing method for a scenario in which the first image is a group album. The specific operation process in FIG. 7 is the same as that in FIG. 2A and it will not be repeated here. For details, reference may be made to FIG. 2A. In addition, FIG. 7 shows a processing method for the scenario of the object setting control. The specific operation process in FIG. 7 is the same as that in FIG. 4 and it will not be repeated here. For details, reference may be made to FIG. 4.

Further referring to FIG. 8A to FIG. 8C, FIG. 8A to FIG. 8C are schematic diagrams of an interface of visualized object following setting according to an embodiment of this disclosure. In the embodiments respectively corresponding to FIG. 2A to FIG. 7, the method of clicking the "Follow" control to implement object following setting on the portrait image is adopted, where a small black bell is used to indicate that the portrait image has been followed. It can be understood that in practical applications, this disclosure is not limited thereto. As shown in FIG. 8A to FIG. 8C, the object following setting may be indicated by lighting up (or highlighting) a small bell icon. As shown in FIG. 8A, it can be seen that the face image 800a in the object following page 80a has been followed by the user and has a target name of 111. The face image 800b is only used for adding a name, and has a corresponding target name of 112, but has not been followed by the user. Other portrait images (e.g., the face image 800c) are not labeled with names. Similarly, the face image in the object following page 80b in FIG. 8B has been followed by the user and has a target name of 111, while other portrait images (e.g., the face image 800e) are not labeled with names. Referring to FIG. 8C again, the face image 800f in the image list 80c has been followed by the user and has a target name of 111, while other portrait images (e.g., the face image 800g) are not labeled with names.

In this embodiment of this disclosure, an object following page may be displayed in a first session page in response to an object following operation performed on a first image. The object following page includes at least one display object in the first image and a setting control corresponding to the at least one display object respectively. The first session page is a page corresponding to a current user terminal, and a user account used by the current user terminal to log in to the communication application is a local user account. In response to a trigger operation performed on a target setting control in the object following page, because the display objects correspond one-to-one to the setting controls, the target display object corresponding to the target setting control may be determined, and further, an object following relationship may be created for the target display object and the local user account. Subsequently, if a new image is obtained and the new image is associated with the target display object, an image update prompt may be provided to the local user account according to the object following relationship. It can be seen from the above that according to this embodiment of this disclosure, the user may perform an object following operation on the target display object (for example, a portrait of the user or an object of interest to the user) in the first image, and when other user accounts share second images associated with the target display object, the user receives an update prompt for these images. In this way, the user can view images related to the user. Because the images that are not related to the user can be filtered out, the efficiency of message viewing can be improved.

Figure 9:
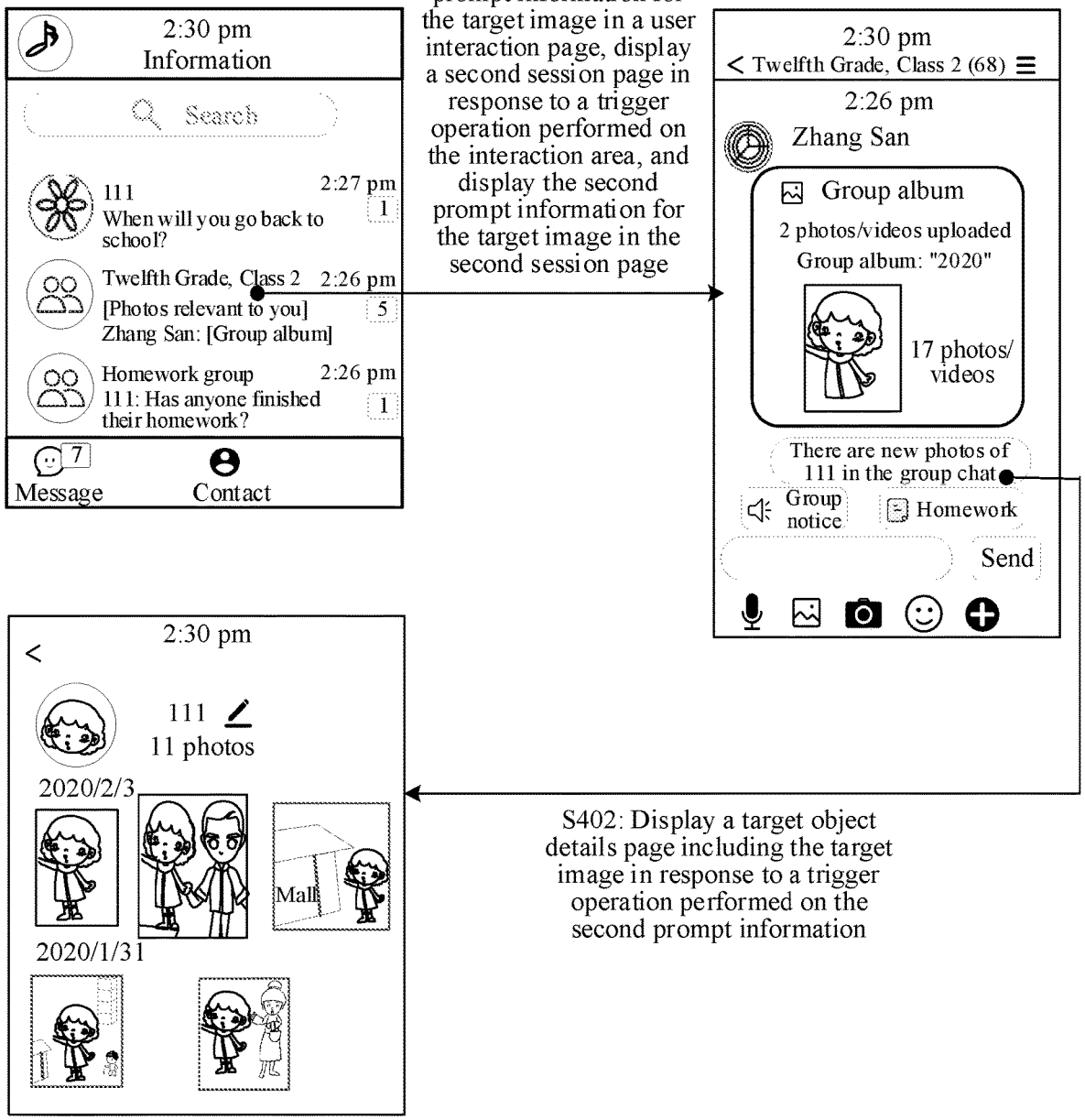
FIG. 9 is a schematic diagram of an interface of displaying image update prompt information according to an embodiment of this disclosure.

Further, FIG. 9 is a schematic diagram of an interface of displaying image update prompt information according to an embodiment of this disclosure. As shown in FIG. 9, the method may include the following steps.

In Step S401, the first prompt information for the target image (a in a user interaction page, display a second session page in response to a trigger operation performed on the interaction area, and display the second prompt information for the target image in the second session page.

Specifically, a second image is obtained; in response to the existence of the target image in the second image, the first prompt information and the second prompt information that are associated with the target name are generated according to the object following relationship, the target image including an object matching with the target display object; the first prompt information for the target image is displayed in a user interaction page, the user interaction page including an interaction area for displaying the first prompt information; The second session page includes the second image.

In Step 402, a target object details page is displayed including the target image in response to a trigger operation performed on the second prompt information.

For details, reference may be made to the embodiment corresponding to FIG. 2B. It can be understood that in FIG. 2B, the user "Zhang San" transmits the second image to the group "Twelfth Grade, Class 2" in the form of group dynamics. In addition, the user "Zhang San" may also share the second image through a group album of the group "Twelfth Grade, Class 2". FIG. 9 shows a processing method for a scenario in which the second image is a group album. The specific operation process in FIG. 9 is the same as that in FIG. 2B and it will not be repeated here. For details, reference may be made to FIG. 2B.

In this embodiment of this disclosure, an object following page may be displayed in a first session page in response to an object following operation performed on a first image. The object following page includes at least one display object in the first image and a setting control corresponding to the at least one display object respectively. The first session page is a page corresponding to a current user terminal, and a user account used by the current user terminal to log in to the communication application is a local user account. In response to a trigger operation performed on a target setting control in the object following page, because the display objects correspond one-to-one to the setting controls, the target display object corresponding to the target setting control may be determined, and further, an object following relationship may be created for the target display object and the local user account. Subsequently, if a new image is obtained and the new image is associated with the target display object, an image update prompt may be provided to the local user account according to the object following relationship. It can be seen from the above that according to this embodiment of this disclosure, the user may perform an object following operation on the target display object (for example, a portrait of the user or an object of interest to the user) in the first image, and when other user accounts share second images associated with the target display object, the user receives an update prompt for these images. In this way, the user can view images related to the user. Because the images that are not related to the user can be filtered out, the efficiency of message viewing can be improved.

Figure 10:
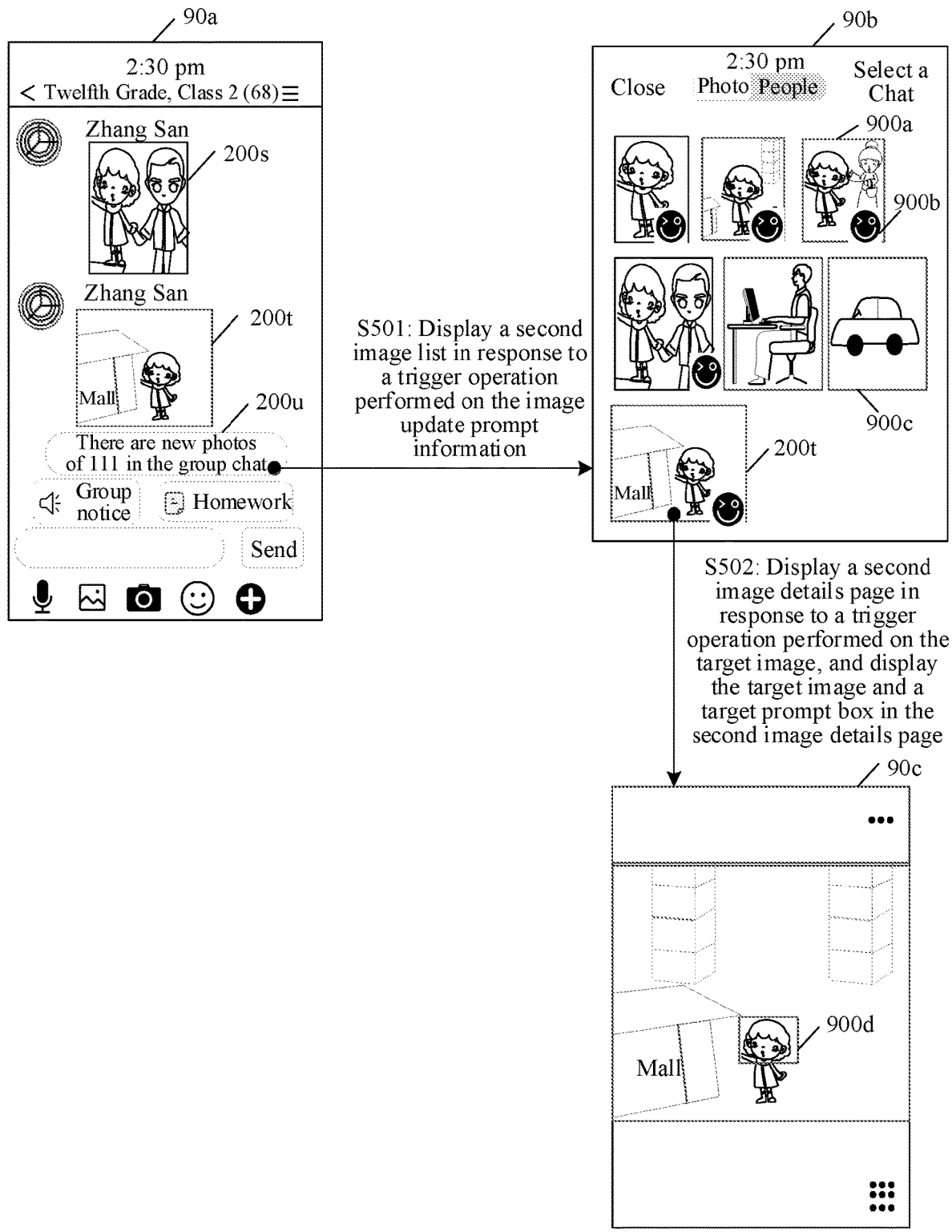
FIG. 10 is a schematic diagram of an interface of displaying a target image according to an embodiment of this disclosure.

Further, FIG. 10 is a schematic diagram of an interface of displaying a target image according to an embodiment of this disclosure. As shown in FIG. 10, step S501 to step S502 may be regarded as supplementary descriptions to the embodiment corresponding to FIG. 3, and may also be regarded as supplementary descriptions to the embodiment corresponding to FIG. 2B. That is, step S501 to step S502 are a specific process of responding to a trigger operation performed on the image update prompt information according to an embodiment of this disclosure, and may be as follows.

In Step S501, a second image list is displayed in response to a trigger operation performed on the image update prompt information.

Specifically, the target image in the second image list carrying an object prompt sign.

For the description of the group session page 90a in FIG. 10, reference may be made to the description of the group session page 20j in the embodiment corresponding to FIG. 2B, and the details will not be repeated here.

The user c clicks on the second prompt information 200u in the group session page 90a, and the corresponding display of the user terminal 10c displays the second image list (i.e., an image list 90b). The target image in the image list 90b (for example, a portrait image 900a and the second image 200t) carries the object prompt sign, that is, a sign 900b in FIG. 10. Images that are irrelevant to the target display object (i.e., the face image 200g in FIG. 2A), such as an image 900c, do not carry the sign 900b.

In Step S502, a second image details page is displayed in response to a trigger operation performed on the target image, and the target image and a target prompt box are displayed in the second image details page.

Specifically, the target prompt box is used for prominently displaying a display area of the object matching with the target display object in the target image.

When the user 10c clicks on the second image 200t, the user terminal 10c may display the second image details page, that is, an image details page 90c in FIG. 10. A target prompt box 900d is displayed in the image details page 90c. If the user c does not operate the image details page 90e within a long time, the target prompt box 900d will be hidden along with the toolbar. If the user c clicks or slides on the image details page 90e, the target prompt box 900d is displayed again.

In an implementation, the target image is determined, and the target image is placed in the target marker box, the target marker box being used for prominently displaying the target image in the second image list; or the target image in the second image list carries a target floating layer, and the target image includes a first target image and a second target image; in response to a trigger operation performed on the first target image, a target floating layer independently displayed in the second image list is displayed, the target floating layer including the first target image; in response to a trigger operation performed on the target floating layer, the second target image is displayed.

It can be understood that, in order to prominently display the target image and mark the target image, as mentioned above, the object prompt sign may be used; or the target image may be placed in the target marker frame, and for example, the border of the target marker frame is brightened or bolded, to outline the target image.

The target image carries a target floating layer. When the user clicks on the target image in the second image list, the display of the user terminal displays the target floating layer on the second image list, and the target floating layer displays the target image. When the user slides or clicks on the target floating layer, the next target image may be displayed. In this case, the image details page does not need to be displayed. If the user clicks on an image that is irrelevant to the target display object, the user terminal displays an image details page of the image. The prominent displaying method is not limited herein, and may be set according to practical application scenarios.

In this embodiment of this disclosure, an object following page may be displayed in a first session page in response to an object following operation performed on a first image. The object following page includes at least one display object in the first image and a setting control corresponding to the at least one display object respectively. The first session page is a page corresponding to a current user terminal, and a user account used by the current user terminal to log in to the communication application is a local user account. In response to a trigger operation performed on a target setting control in the object following page, because the display objects correspond one-to-one to the setting controls, the target display object corresponding to the target setting control may be determined, and further, an object following relationship may be created for the target display object and the local user account. Subsequently, if a new image is obtained and the new image is associated with the target display object, an image update prompt may be provided to the local user account according to the object following relationship. It can be seen from the above that according to this embodiment of this disclosure, the user may perform an object following operation on the target display object (for example, a portrait of the user or an object of interest to the user) in the first image, and when other user accounts share second images associated with the target display object, the user receives an update prompt for these images. In this way, the user can view images related to the user. Because the images that are not related to the user can be filtered out, the efficiency of message viewing can be improved.

Figure 11:
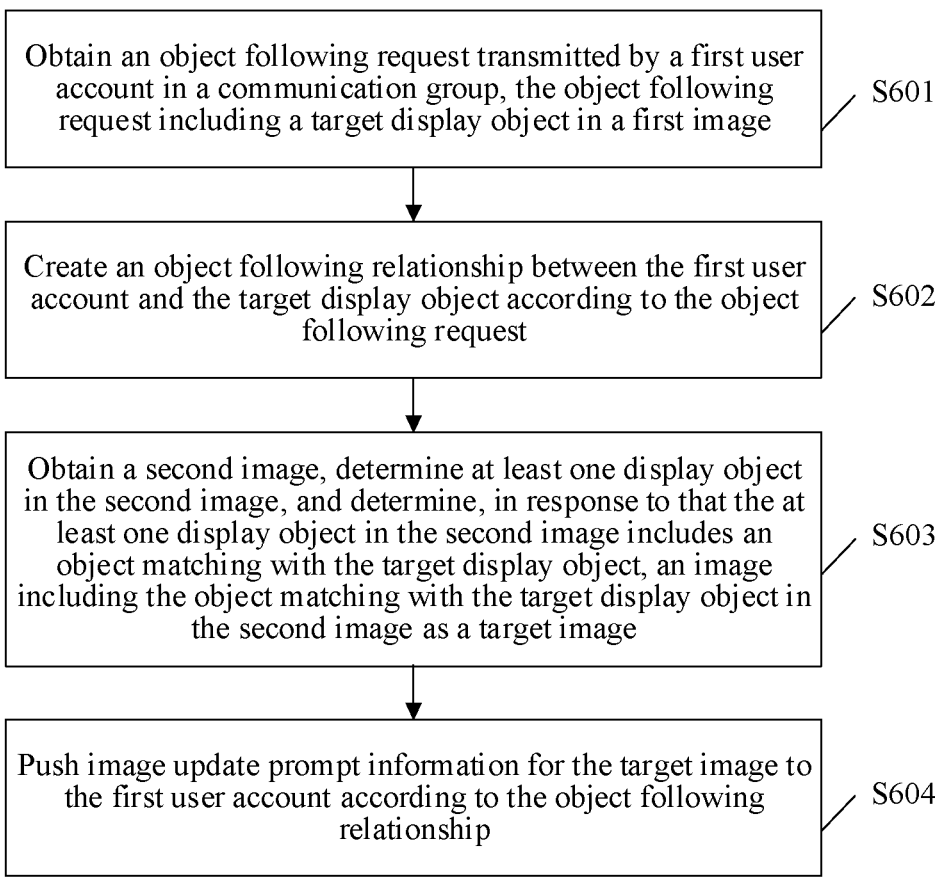
FIG. 11 is a schematic flowchart of an image processing method according to an embodiment of this disclosure.

Further, FIG. 11 is a schematic flowchart of an image processing method according to an embodiment of this disclosure. This embodiment is, for example, executed by a server, e.g., the server 10a in FIG. 1A or the server 20a in FIG. 2A. As shown in FIG. 11, the image processing method includes the following steps.

In Step S601, an object following request transmitted by a first user account in a communication group is obtained, the object following request including a target display object in a first image.

Specifically, the first image transmitted by a second user account in the communication group is obtained, and at least one display object in the first image is identified, the at least one display object in the first image including the target display object. Object following prompt information for the at least one display object in the first image is pushed to the communication group, so that the first user account responds to the object following prompt information; and at least one display object data is generated according to the at least one display object in the first image, and the at least one display object data is transmitted to a terminal corresponding to the first user account, so that the terminal corresponding to the first user account generates the object following request according to the at least one display object data.

In Step S602, an object following relationship is created between the first user account and the target display object according to the object following request.

In Step S603, a second image is obtained, at least one display object is determined in the second image, and, in response to a determination that the at least one display object in the second image includes an object matching with the target display object, a section of the second image including the object matching with the target display object is determined as a target image.

Specifically, the second image transmitted by a third user account in the communication group is obtained.

In Step S604, image update prompt information for the target image is pushed to the first user account according to the object following relationship.

For a specific implementation process of the above steps S201 to S204, reference may be made to FIG. 3 to FIG. 10, and the details will not be repeated here.

In an implementation, the first user account is determined according to the target display object and the object following relationship; a target association session is created according to the third user account and the first user account; the group prompt information for the target image is pushed to a terminal corresponding to the first user account according to the communication group, so that the terminal corresponding to the first user account displays the group prompt information in the communication group; and the session prompt information for the target image is pushed to a terminal corresponding to the first user account according to the target association session, so that the terminal corresponding to the first user account displays the session prompt information in the target association session.

Figure 12:
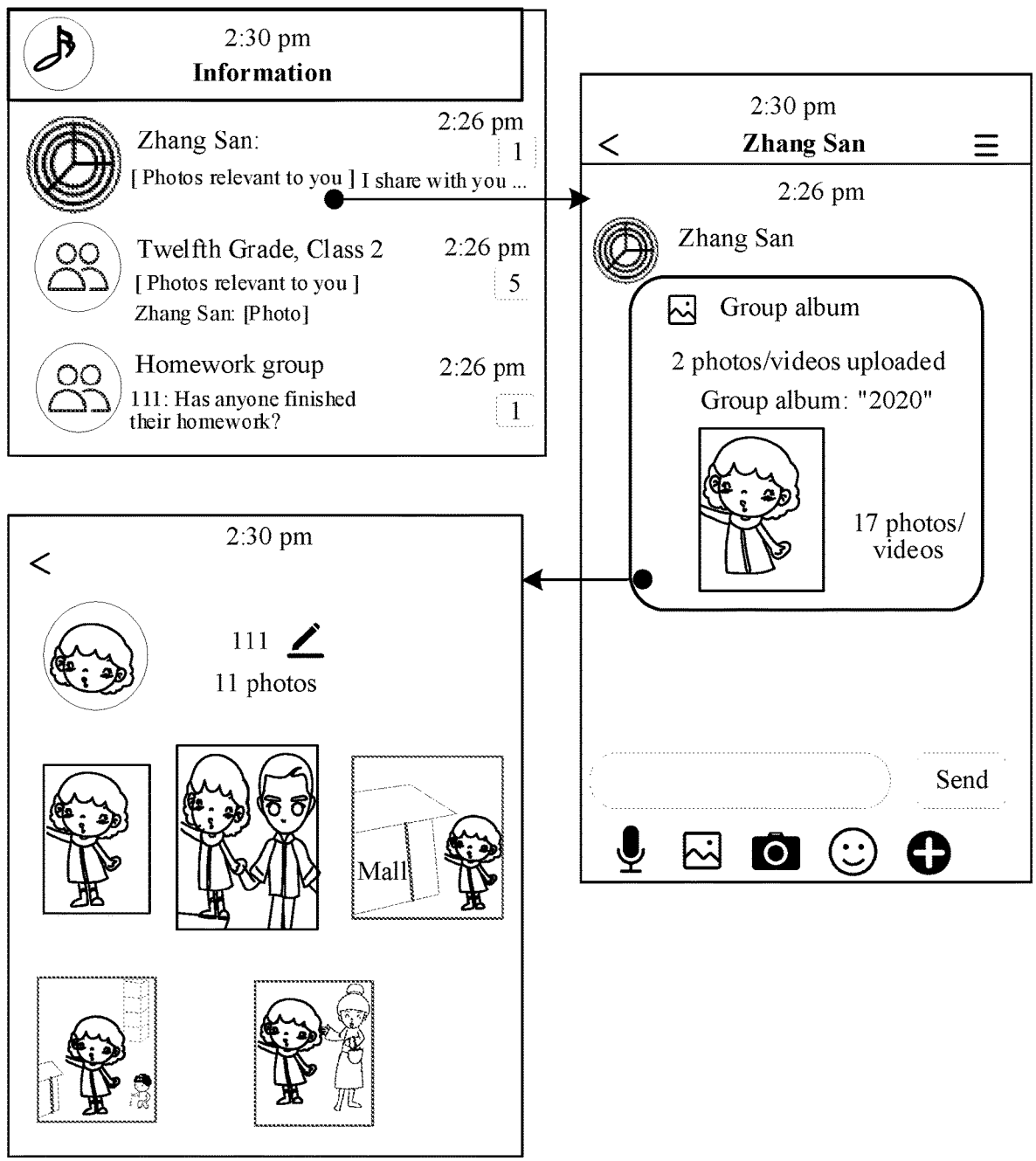
FIG. 12 is a schematic diagram of an image processing scenario according to an embodiment of this disclosure.

An update notification reminder for the second image may be received in the communication group, or may be received through a private message. For example, a teacher shares a photo containing a student in the group "Twelfth Grade, Class 2", and a parent who have followed the face of the student may receive a private message sent by the teacher and view the photo. FIG. 9 above is a schematic diagram of a scenario of group prompt information and a schematic diagram of a scenario of session prompt information. Further referring to FIG. 12, FIG. 12 is a schematic diagram of an image processing scenario according to an embodiment of this disclosure. The specific operation process in FIG. 12 is the same as that in FIG. 2B and it will not be repeated here. For details, reference may be made to FIG. 2B.

In this embodiment of this disclosure, an object following page may be displayed in a first session page in response to an object following operation performed on a first image. The object following page includes at least one display object in the first image and a setting control corresponding to the at least one display object respectively. The first session page is a page corresponding to a current user terminal, and a user account used by the current user terminal to log in to the communication application is a local user account. In response to a trigger operation performed on a target setting control in the object following page, because the display objects correspond one-to-one to the setting controls, the target display object corresponding to the target setting control may be determined, and further, an object following relationship may be created for the target display object and the local user account. Subsequently, if a new image is obtained and the new image is associated with the target display object, an image update prompt may be provided to the local user account according to the object following relationship. It can be seen from the above that according to this embodiment of this disclosure, the user may perform an object following operation on the target display object (for example, a portrait of the user or an object of interest to the user) in the first image, and when other user accounts share second images associated with the target display object, the user receives an update prompt for these images. In this way, the user can view images related to the user. Because the images that are not related to the user can be filtered out, the efficiency of message viewing can be improved.

Figure 13:
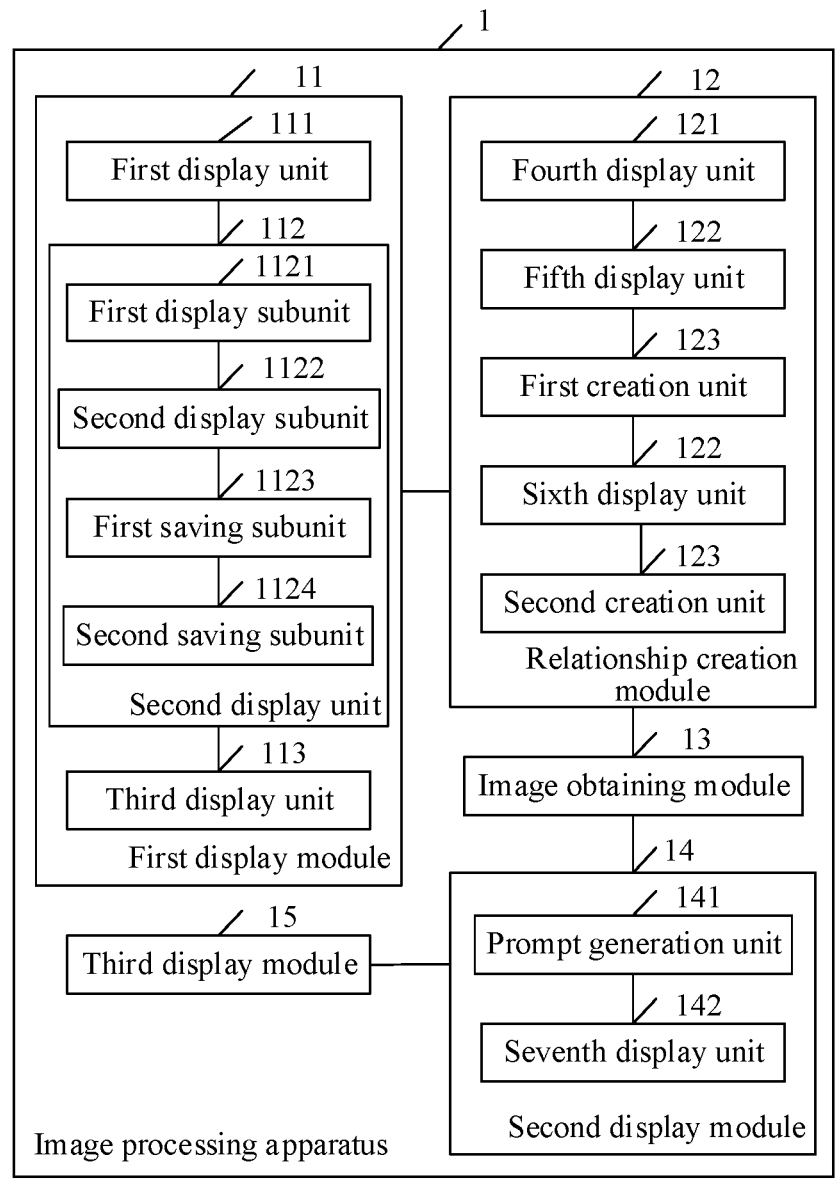
FIG. 13 is a schematic structural diagram of an image processing apparatus according to an embodiment of this disclosure.

Further, FIG. 13 is a schematic structural diagram of an image processing apparatus according to an embodiment of this disclosure. The image processing apparatus may be a computer program (including program code) running in a computer device. For example, the image processing apparatus is an application software. The apparatus may be configured to execute the corresponding steps in the method provided in the embodiments of this disclosure. As shown in FIG. 13, the image processing apparatus 1 may include: a first display module 11 and a relationship creation module 12. One or more modules, submodules, units, and/or sub-units of the apparatus can be implemented by processing circuitry, software, or a combination thereof, for example.

The first display module 11 is configured to display an object following page in a first session page in response to an object following operation performed on a first image, the object following page including at least one display object in the first image and a setting control corresponding to the at least one display object respectively, and the first session page being a page corresponding to a local user account.

The relationship creation module 12 is configured to create an object following relationship for a target display object and the local user account in response to a trigger operation performed on a target setting control in the object following page, the object following relationship being used for providing an image update prompt to the local user account, and an image prompted by the image update prompt being associated with the target display object.

For specific implementations of functions of the first display module 11 and the relationship creation module 12, reference may be made to step S101 to step S102 in the embodiment corresponding to FIG. 3, and the details will not be repeated here.

Still referring to FIG. 13, the first display module 11 may include a first display unit 111.

The first display unit 111 is configured to display the first image and object following prompt information for the first image in the first session page.

The first display unit 111 is further configured to display the object following page in response to a trigger operation performed on the object following prompt information.

For a specific implementation of functions of the first display unit 111, reference may be made to step S101 in the embodiment corresponding to FIG. 3, and the details will not be repeated here.

Still referring to FIG. 13, the first display module 11 may include a second display unit 112.

The second display unit 112 is configured to display the first image in the first session page, and display a first image details page in response to a trigger operation performed on a sub-image in the first image, the first image details page including the sub-image, a first multi-function control, and a second multi-function control.

The second display unit 112 is further configured to display a first image list including the first image in response to a trigger operation performed on the first multi-function control, and display the object following page in response to a trigger operation performed on an object display control in the first image list.

The second display unit 112 is further configured to output a multi-function sub-page independently displayed on the first image details page in response to a trigger operation performed on the second multi-function control, and display the object following page in response to a trigger operation performed on the multi-function sub-page.

For a specific implementation of functions of the second display unit 112, reference may be made to step S201 to step S207 in the embodiment corresponding to FIG. 5A to FIG. 5B, and the details will not be repeated here.

Still referring to FIG. 13, the second display unit 112 may include: a first display sub-unit 1121, a second display sub-unit 1122, a first saving sub-unit 1123 and a second saving sub-unit 1124.

The first display sub-unit 1121 is configured to display the object following page in response to a trigger operation performed on an object following control.

The second display sub-unit 1122 is configured to switch from the multi-function sub-page to an object following option sub-page independently displayed on the first image details page, in response to a trigger operation performed on an image saving control, the object following option sub-page including a cancel control and a follow control.

The first saving sub-unit 1123 is configured to save the sub-image in response to a trigger operation performed on the cancel control.

The second saving sub-unit 1124 is configured to, in response to a trigger operation performed on the follow control, save the sub-image and jump to the object following page.

For specific implementations of functions of the first display sub-unit 1121, the second display sub-unit 1122, the first saving sub-unit 1123 and the second saving sub-unit 1124, reference may be made to step S205 to step S207 in the embodiment corresponding to FIG. 5B, and the details will not be repeated here.

Still referring to FIG. 13, the first display module 11 may include a third display unit 113.

The third display unit 113 is configured to display the first image in the first session page, and displaying the object following page in response to a trigger operation performed on the first image, the object following page including the first image and an object following area, and the object following area including the at least one display object in the first image.

The relationship creation module 12 includes a fourth display unit 121.

The fourth display unit 121 is configured to display a to-be-followed object details page in response to a trigger operation performed on the target setting control in the object following area, the to-be-followed object details page including an object name control, an object following control in a non-followed state, and the target display object.

The fourth display unit 121 is further configured to display a name setting page in response to a trigger operation performed on the object following control in the non-followed state;

The fourth display unit 121 is further configured to display the name setting page in which a target name has been inputted, in response to a name input operation performed on the name setting page, the name setting page including a first confirmation control.

The fourth display unit 121 is further configured to display a followed object details page in response to a trigger operation performed on the first confirmation control, the followed object details page including the object name control carrying the target name, the object following control in a followed state, and the target display object, and the object following control in the followed state being used for representing that the object following relationship has been created between the target display object and the local user account.

For specific implementations of functions of the third display unit 113 and the fourth display unit 121, reference may be made to step S101 to step S102 in the embodiment corresponding to FIG. 3, and the details will not be repeated here.

Still referring to FIG. 13, the relationship creation module 12 may include a fifth display unit 122 and a first creation unit 123.

The fifth display unit 122 is configured to display a to-be-followed object details page in response to a trigger operation performed on a target object setting control in the object following page, the to-be-followed object details page including an object name control, an object following control in a non-followed state, and the target display object.

The fifth display unit 122 is further configured to display a name setting page in response to a trigger operation performed on the object name control.

The fifth display unit 122 is further configured to output an associated name list independently displayed on the name setting page in response to a name input operation performed on the name setting page, and display a transition object details page in response to a trigger operation performed on a target name (selected name) in the associated name list, the transition object details page including the object name control carrying the target name, the object following control in the non-followed state, and the target display object.

The first creation unit 123 is configured to create the object following relationship for the target display object and the local user account in response to a trigger operation performed on the transition object details page.

For specific implementations of functions of the fifth display unit 122 and the first creation unit 123, reference may be made to step S301 to step S306 in the embodiment corresponding to FIG. 6A to FIG. 6B, and the details will not be repeated here.

Still referring to FIG. 13, the first creation unit 123 is further configured to display a transition object following page in response to a trigger operation performed on the return control, the transition object following page including the target display object marked with the target name, and a following setting control, and the following setting control being used for instructing to create an object following relationship between the target display object and a user account (the local user account).

The first creation unit 123 is further configured to display a followed object details page in response to a trigger operation performed on the object following control in the non-followed state, the followed object details page including the object name control indicating the target name, the object following control in a followed state, and the target display object, and the object following control in the followed state being used for representing that the object following relationship has been created between the target display object and the local user account.

For a specific implementation of functions of the first creation unit 123, reference may be made to step S305 to step S306 in the embodiment corresponding to FIG. 6B, and the details will not be repeated here.

Still referring to FIG. 13, the relationship creation module 12 may include a sixth display unit 124 and a second creation unit 125.

The sixth display unit 124 is configured to display a name setting page in response to a trigger operation performed on a target following setting control in the object following page, the name setting page including the target display object corresponding to the target following setting control.

The sixth display unit 124 is further configured to output an associated name list independently displayed on the name setting page in response to a name input operation performed on the name setting page, and display the name setting page including the target display object marked with the target name in response to a trigger operation performed on a target name in the associated name list, the name setting page including a second confirmation control.

The second creation unit 125 is configured to transmit an object following request to a server in response to a trigger operation performed on the second confirmation control, so that the server creates the object following relationship for the target display object, the target name, and the local user account according to the object following request, the object following request carrying the local user account, the target name, and the target display object.

For specific implementations of functions of the sixth display unit 124 and the second creation unit 125, reference may be made to step S102 in the embodiment corresponding to FIG. 3, and the details will not be repeated here.

Still referring to FIG. 13, the image processing apparatus 1 may further include an image obtaining module 13 and a second display module 14.

The image obtaining module 13 is configured to obtain a second image.

The second display module 14 is configured to display, in response to existence of a target image in the second image, image update prompt information associated with the target image and the target name according to the object following relationship, the target image being a portion of the second image that includes an object matching with the target display object.

For specific implementations of functions of the image obtaining module 13 and the second display module 14, reference may be made to step S401 to step S402 in the embodiment corresponding to FIG. 9, and the details will not be repeated here.

Still referring to FIG. 13, the second display module 14 may include a prompt generation unit 141 and a seventh display unit 142.

The prompt generation unit 141 is configured to generate, in response to the existence of the target image in the second image, the first prompt information and the second prompt information that are associated with the target name according to the object following relationship, the target image including an object matching with the target display object.

The seventh display unit 142 is configured to display the first prompt information for the target image in a user interaction page, the user interaction page including an interaction area for displaying the first prompt information.

The seventh display unit 142 is further configured to display a second session page in response to a trigger operation performed on the interaction area, and display the second prompt information for the target image in the second session page, the second session page including the second image.

The seventh display unit 142 is further configured to display a target object details page including the target image in response to a trigger operation performed on the second prompt information.

For specific implementations of functions of the prompt generation unit 141 and the seventh display unit 142, reference may be made to step S401 to step S402 in the embodiment corresponding to FIG. 9, and the details will not be repeated here.

Still referring to FIG. 13, the image processing apparatus 1 may further include a third display module 15.

The third display module 15 is configured to display a second image list in response to a trigger operation performed on the image update prompt information, the target image in the second image list carrying an object prompt sign.

The third display module 15 is further configured to display a second image details page in response to a trigger operation performed on the target image, and displaying the target image and a target prompt box in the second image details page, the target prompt box being used for prominently displaying a display area of the object matching with the target display object in the target image.

For a specific implementation of functions of the third display module 15, reference may be made to step S501 to step S502 in the embodiment corresponding to FIG. 10, and the details will not be repeated here.

In this embodiment of this disclosure, an object following page may be displayed in a first session page in response to an object following operation performed on a first image. The object following page includes at least one display object in the first image and a setting control corresponding to the at least one display object respectively. The first session page is a page corresponding to a current user terminal, and a user account used by the current user terminal to log in to the communication application is a local user account. In response to a trigger operation performed on a target setting control in the object following page, because the display objects correspond one-to-one to the setting controls, the target display object corresponding to the target setting control may be determined, and further, an object following relationship may be created for the target display object and the local user account. Subsequently, if a new image is obtained and the new image is associated with the target display object, an image update prompt may be provided to the local user account according to the object following relationship. It can be seen from the above that according to this embodiment of this disclosure, the user may perform an object following operation on the target display object (for example, a portrait of the user or an object of interest to the user) in the first image, and when other user accounts share second images associated with the target display object, the user receives an update prompt for these images. In this way, the user can view images related to the user. Because the images that are not related to the user can be filtered out, the efficiency of message viewing can be improved.

Figure 14:
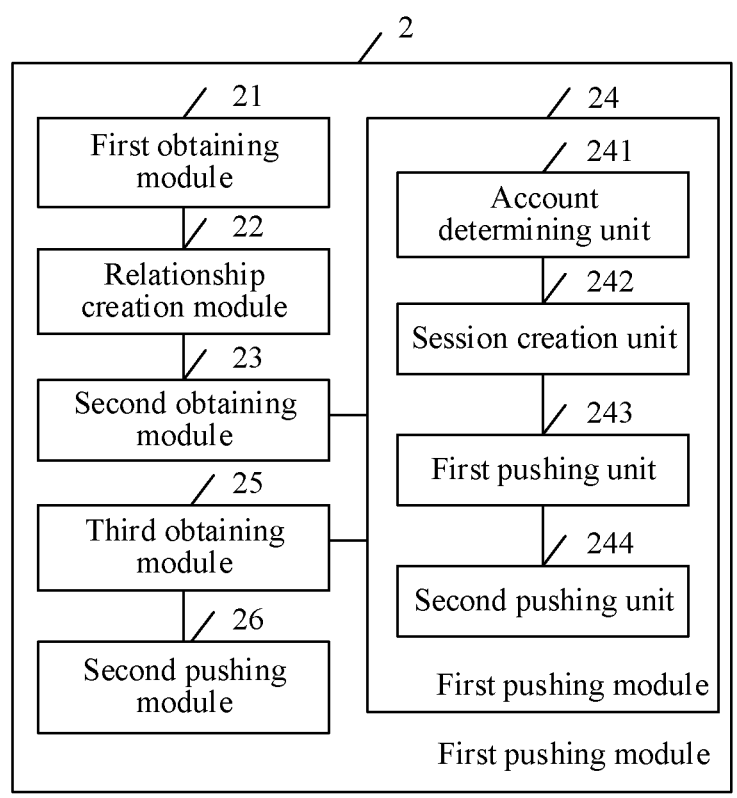
FIG. 14 is a schematic structural diagram of an image processing apparatus according to an embodiment of this disclosure.

Further, FIG. 14 is a schematic structural diagram of an image processing apparatus according to an embodiment of this disclosure. The image processing apparatus may be a computer program (including program code) running in a computer device. For example, the image processing apparatus is an application software. The apparatus may be configured to execute the corresponding steps in the method provided in the embodiments of this disclosure. As shown in FIG. 14, the image processing apparatus 2 may include a first obtaining module 21, a relationship creation module 22, a second obtaining module 23, and a first pushing module 24.

The first obtaining module 21 is configured to obtain an object following request transmitted by a first user account in a communication group, the object following request including a target display object (selected display object) in a first image.

The relationship creation module 22 is configured to create an object following relationship between the first user account and the target display object according to the object following request.

The second obtaining module 23 is configured to obtain a second image, determine at least one display object in the second image, and determine, in response to that the at least one display object in the second image includes an object matching with the target display object, an image including the object matching with the target display object in the second image as a target image.

The first pushing module 24 is configured to push image update prompt information for the target image to the first user account according to the object following relationship.

For specific implementations of functions of the first obtaining module 21, the relationship creation module 22, the second obtaining module 23, and the first pushing module 24, reference may be made to step S601 to step S604 in the embodiment corresponding to FIG. 11, and the details will not be repeated here.

Still referring to FIG. 14, the image processing apparatus 2 may further include a third obtaining module 25 and a second pushing module 26.

The third obtaining module 25 is configured to obtain the first image transmitted by a second user account in the communication group, and identify at least one display object in the first image, the at least one display object in the first image including the target display object.

The second pushing module 26 is configured to push object following prompt information for the at least one display object in the first image to the communication group, so that the first user account responds to the object following prompt information.

The second pushing module 26 is further configured to generate at least one display object data according to the at least one display object in the first image, and transmit the at least one display object data to a terminal corresponding to the first user account, so that the terminal corresponding to the first user account generates the object following request according to the at least one display object data.

For specific implementations of functions of the third obtaining module 25 and the second pushing module 26, reference may be made to the embodiment corresponding to FIG. 2A, and the details will not be repeated here.

Still referring to FIG. 14, the second obtaining module 23 is further configured to obtain the second image transmitted by a third user account in the communication group; and the first pushing module 24 includes an account determination unit 241, a session creation unit 242, a first pushing unit 243, and a second pushing unit 244.

The account determination unit 241 is configured to determine the first user account according to the target display object and the object following relationship.

The session creation unit 242 is configured to create a target association session according to the third user account and the first user account.

The first pushing unit 243 is configured to push the group prompt information for the target image to a terminal corresponding to the first user account according to the communication group, so that the terminal corresponding to the first user account displays the group prompt information in the communication group.

The second pushing unit 244 is configured to push the session prompt information for the target image to a terminal corresponding to the first user account according to the target association session, so that the terminal corresponding to the first user account displays the session prompt information in the target association session.

For specific implementations of functions of the account determination unit 241, the session creation unit 242, the first pushing unit 243, and the second pushing unit 244, reference may be made to the embodiment corresponding to FIG. 12, and the details will not be repeated here.

In this embodiment of this disclosure, an object following page may be displayed in a first session page in response to an object following operation performed on a first image. The object following page includes at least one display object in the first image and a setting control corresponding to the at least one display object respectively. The first session page is a page corresponding to the user terminal, and the user account of the user terminal logging in to a communication application is a local user account. In response to a trigger operation performed on a target setting control in the object following page, because the display objects correspond one-to-one to the setting controls, the target display object corresponding to the target setting control may be determined, and further, an object following relationship may be created for the target display object and the local user account. Subsequently, if a new image is obtained and the new image is associated with the target display object, an image update prompt may be provided to the local user account according to the object following relationship. It can be seen from the above that according to this embodiment of this disclosure, the user may perform an object following operation on the target display object (for example, a portrait of the user or an object of interest to the user) in the first image, and when other user accounts share second images associated with the target display object, the user receives an update prompt for these images. In this way, the user can view images related to the user. Because the images that are not related to the user can be filtered out, the efficiency of message viewing can be improved.

Figure 15:
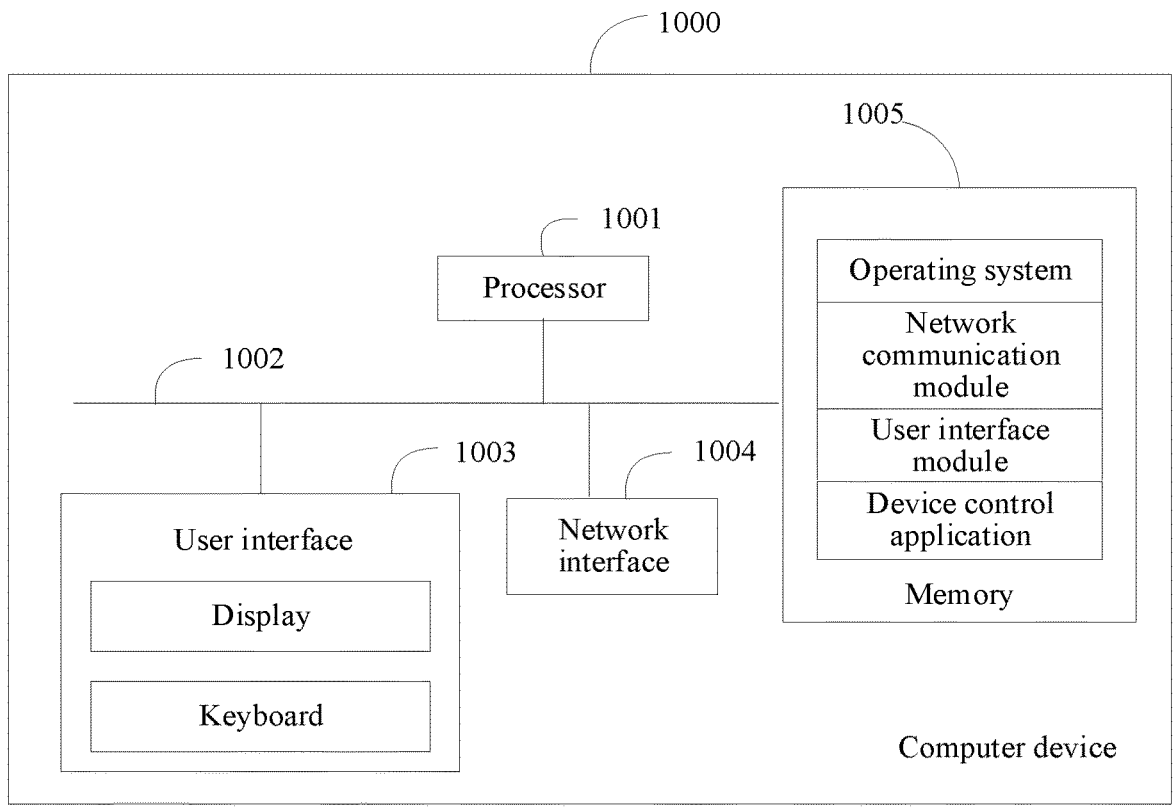
FIG. 15 is a schematic structural diagram of a computer device according to an embodiment of this disclosure.

Further, referring to FIG. 15, FIG. 15 is a schematic structural diagram of a computer device according to an embodiment of this disclosure. As shown in FIG. 15, the computer device 1000 may include: a processor 1001 (including processing circuitry), a network interface 1004, and a memory 1005. In addition, the computer device 1000 may further include a user interface 1003 and at least one communication bus 1002. The communication bus 1002 is configured to implement connection and communication between the components. The user interface 1003 may include a display and a keyboard. The user interface 1003 may further include a standard wired interface or wireless interface. The network interface 1004 may include a standard wired interface or wireless interface (for example, a Wi-Fi interface). The memory 1005 may be a high-speed RAM memory, or may be a non-volatile memory, for example, at least one magnetic disk memory. The memory 1005 may alternatively be at least one storage apparatus located away from the processor 1001. As shown in FIG. 15, the memory 1005 used as a non-transitory computer-readable storage medium may include an operating system, a network communication module, a user interface module, and a device-control application program.

In the computer device 1000 shown in FIG. 15, the network interface 1004 may provide a network communication function, the user interface 1003 is mainly configured to provide an input interface for a user, and the processor 1001 may be configured to invoke the device control application stored in the memory 1005, to implement: displaying an object following page in a first session page in response to an object following operation performed on a first image, the object following page including at least one display object in the first image and a setting control corresponding to the at least one display object respectively, and the first session page being a page corresponding to a local user account; creating an object following relationship for a target display object and the local user account in response to a trigger operation performed on a target setting control in the object following page, the object following relationship being used for providing an image update prompt to the local user account, and an image prompted by the image update prompt being associated with the target display object.

In an embodiment, in executing the operation of displaying an object following page in a first session page in response to an object following operation performed on a first image, the processor 1001 specifically executes the following operations: displaying the first image and object following prompt information for the first image in the first session page; and displaying the object following page in response to a trigger operation performed on the object following prompt information.

In an embodiment, in executing the operation of displaying an object following page in a first session page in response to an object following operation performed on a first image, the processor 1001 specifically executes the following operations: displaying the first image in the first session page, and displaying a first image details page in response to a trigger operation performed on a sub-image (portion) in the first image, the first image details page including the sub-image, a first multi-function control, and a second multi-function control; displaying a first image list including the first image in response to a trigger operation performed on the first multi-function control, and displaying the object following page in response to a trigger operation performed on an object display control in the first image list; and outputting a multi-function sub-page independently displayed on the first image details page in response to a trigger operation performed on the second multi-function control, and displaying the object following page in response to a trigger operation performed on the multi-function sub-page.

In an embodiment, the multi-function sub-page includes an object following control and an image saving control; and in executing the operation of displaying the object following page in response to a trigger operation performed on the multi-function sub-page, the processor 1001 specifically executes the following operations: displaying the object following page in response to a trigger operation performed on the object following control; switching from the multi-function sub-page to an object following option sub-page independently displayed on the first image details page, in response to a trigger operation performed on the image saving control, the object following option sub-page including a cancel control and a follow control; saving the sub-image in response to a trigger operation performed on the cancel control; and saving the sub-image in response to a trigger operation performed on the follow control, and jumping to the object following page.

In an embodiment, in executing the operation of displaying an object following page in a first session page in response to an object following operation performed on a first image, the processor 1001 specifically executes the following operations: displaying the first image in the first session page, and displaying the object following page in response to a trigger operation performed on the first image, the object following page including the first image and an object following area, and the object following area including the at least one display object in the first image; and in executing the operation of creating an object following relationship for a target display object (selected display object) and the local user account in response to a trigger operation performed on a target setting control in the object following page, the processor 1001 specifically executes the following operations: displaying a to-be-followed object details page in response to a trigger operation performed on the target setting control in the object following area, the to-be-followed object details page including an object name control, an object following control in a non-followed state, and the target display object; displaying a name setting page in response to a trigger operation performed on the object following control in the non-followed state; displaying the name setting page in which a target name has been inputted, in response to a name input operation performed on the name setting page, the name setting page including a first confirmation control; and displaying a followed object details page in response to a trigger operation performed on the first confirmation control, the followed object details page including the object name control carrying the target name, the object following control in a followed state, and the target display object, and the object following control in the followed state being used for representing that the object following relationship has been created between the target display object and the local user account.

In an embodiment, the setting control includes an object setting control; and in executing the operation of creating an object following relationship for a target display object and the local user account in response to a trigger operation performed on a target setting control in the object following page, the processor 1001 specifically executes the following operations: displaying a to-be-followed object details page in response to a trigger operation performed on a target object setting control in the object following page, the to-be-followed object details page including an object name control, an object following control in a non-followed state, and the target display object; displaying a name setting page in response to a trigger operation performed on the object name control; outputting an associated name list independently displayed on the name setting page in response to a name input operation performed on the name setting page, and displaying a transition object details page in response to a trigger operation performed on a target name in the associated name list, the transition object details page including the object name control carrying the target name, the object following control in the non-followed state, and the target display object; and creating the object following relationship for the target display object and the local user account in response to a trigger operation performed on the transition object details page.

In an embodiment, the transition object details page includes a return control; and in executing the operation of creating the object following relationship for the target display object and the local user account in response to a trigger operation performed on the transition object details page, the processor 1001 specifically executes the following operations: displaying a transition object following page in response to a trigger operation performed on the return control, the transition object following page including the target display object (selected display object) marked with the target name (selected name), and a following setting control, and the following setting control being used for instructing to create an object following relationship between the target display object and the local user account; and displaying a followed object details page in response to a trigger operation performed on the object following control in the non-followed state, the followed object details page including the object name control carrying the target name, the object following control in a followed state, and the target display object, and the object following control in the followed state being used for representing that the object following relationship has been created between the target display object and the local user account.

In an embodiment, the object following page includes a following setting control; and in executing the operation of creating an object following relationship for a target display object and the local user account in response to a trigger operation performed on a target setting control in the object following page, the processor 1001 specifically executes the following operations: displaying a name setting page in response to a trigger operation performed on a target following setting control in the object following page, the name setting page including the target display object corresponding to the target following setting control; outputting an associated name list independently displayed on the name setting page in response to a name input operation performed on the name setting page, and displaying the name setting page including the target display object marked with the target name in response to a trigger operation performed on a target name in the associated name list, the name setting page including a second confirmation control; and transmitting an object following request to a server in response to a trigger operation performed on the second confirmation control, so that the server creates the object following relationship for the target display object, the target name, and the local user account according to the object following request, the object following request carrying the local user account, the target name, and the target display object.

In an embodiment, the processor 1001 further executes the following operations: obtaining a second image; and displaying, in response to existence of a target image in the second image, image update prompt information associated with the target image and the target name according to the object following relationship, the target image including an object matching with the target display object.

In an embodiment, the image update prompt information includes first prompt information and second prompt information; and in executing the operation of displaying, in response to existence of a target image including the object matching with the target display object in the second image, image update prompt information associated with the target image and the target name according to the object following relationship, the processor 1001 specifically executes the following operations: generating, in response to the existence of the target image in the second image, the first prompt information and the second prompt information that are associated with the target name according to the object following relationship, the target image including an object matching with the target display object; displaying the first prompt information for the target image in a user interaction page, the user interaction page including an interaction area for displaying the first prompt information; displaying a second session page in response to a trigger operation performed on the interaction area, and displaying the second prompt information for the target image in the second session page, the second session page including the second image; and displaying a target object details page including the target image in response to a trigger operation performed on the second prompt information.

In an embodiment, the processor 1001 further executes the following operations: displaying a second image list in response to a trigger operation performed on the image update prompt information, the target image in the second image list carrying an object prompt sign; and displaying a second image details page in response to a trigger operation performed on the target image, and displaying the target image and a target prompt box in the second image details page, the target prompt box being used for prominently displaying a display area of the object matching with the target display object in the target image.

In this embodiment of this disclosure, an object following page may be displayed in a first session page in response to an object following operation performed on a first image. The object following page includes at least one display object in the first image and a setting control corresponding to the at least one display object respectively. The first session page is a page corresponding to a current user terminal, and a user account used by the current user terminal to log in to the communication application is a local user account. In response to a trigger operation performed on a target setting control in the object following page, because the display objects correspond one-to-one to the setting controls, the target display object corresponding to the target setting control may be determined, and further, an object following relationship may be created for the target display object and the local user account. Subsequently, if a new image is obtained and the new image is associated with the target display object, an image update prompt may be provided to the local user account according to the object following relationship. It can be seen from the above that according to this embodiment of this disclosure, the user may perform an object following operation on the target display object (for example, a portrait of the user or an object of interest to the user) in the first image, and when other user accounts share second images associated with the target display object, the user receives an update prompt for these images. In this way, the user can view images related to the user. Because the images that are not related to the user can be filtered out, the efficiency of message viewing can be improved.

Figure 16:
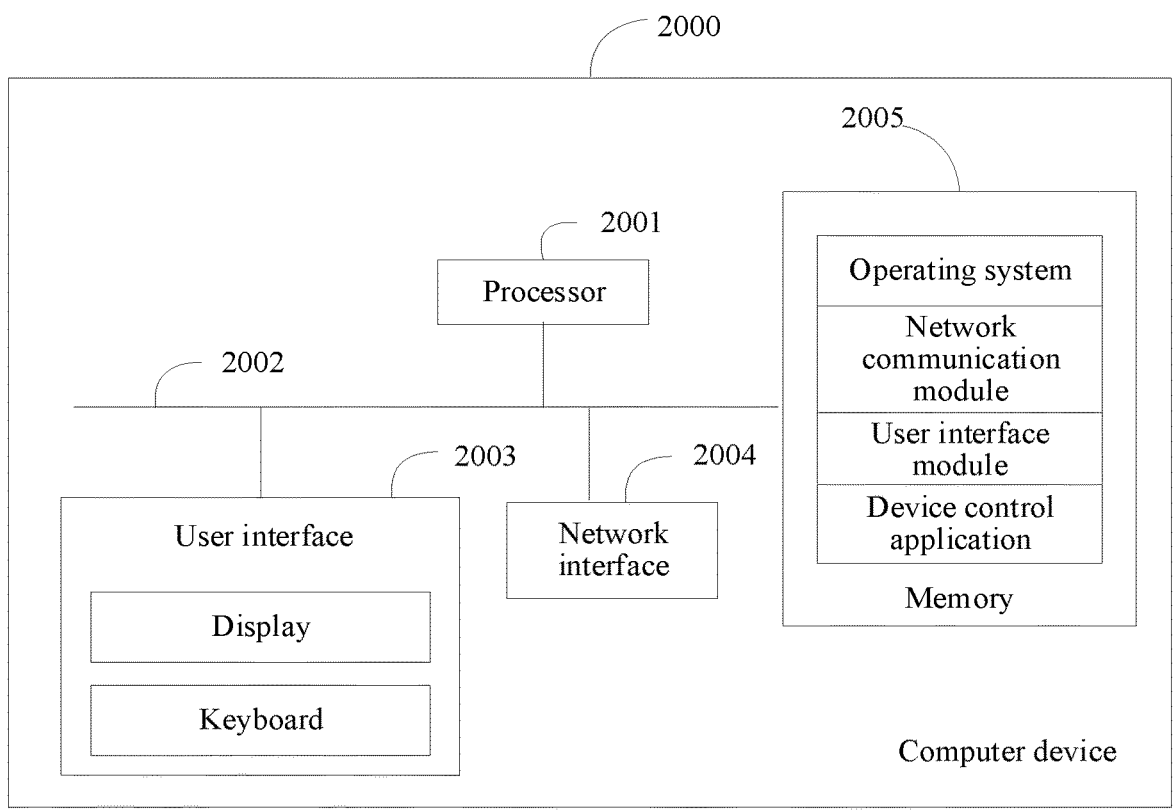
FIG. 16 is a schematic structural diagram of a computer device according to an embodiment of this disclosure.

Further, referring to FIG. 16, FIG. 16 is a schematic structural diagram of a computer device according to an embodiment of this disclosure. As shown in FIG. 16, the computer device 2000 may include: a processor 2001, a network interface 2004, and a memory 2005. In addition, the computer device 2000 may further include a user interface 2003 and at least one communication bus 2002. The communication bus 2002 is configured to implement connection and communication between the components. The user interface 2003 may include a display and a keyboard. The user interface 2003 may further include a standard wired interface or wireless interface. The network interface 2004 may include a standard wired interface or wireless interface (for example, a Wi-Fi interface). The memory 2005 may be a high-speed RAM memory, or may be a non-volatile memory, for example, at least one magnetic disk memory. The memory 2005 may alternatively be at least one storage apparatus located away from the processor 2001. As shown in FIG. 16, the memory 2005 used as a computer-readable storage medium may include an operating system, a network communication module, a user interface module, and a device-control application program.

In the computer device 2000 shown in FIG. 16, the network interface 2004 may provide a network communication function, the user interface 2003 is mainly configured to provide an input interface for a user, and the processor 2001 may be configured to invoke the device control application stored in the memory 2005, to implement: obtaining an object following request transmitted by a first user account in a communication group, the object following request including a target display object in a first image; creating an object following relationship between the first user account and the target display object according to the object following request; obtaining a second image, determining at least one display object in the second image, and determining, in response to a determination that the at least one display object in the second image includes an object matching with the target display object, a portion of the second image including the object matching with the target display object in the second image as a target image; and pushing image update prompt information for the target image to the first user account according to the object following relationship.

In an embodiment, the processor 1001 further executes the following operations: obtaining the first image transmitted by a second user account in the communication group, and identifying at least one display object in the first image, the at least one display object in the first image including the target display object; pushing object following prompt information for the at least one display object in the first image to the communication group, so that the first user account responds to the object following prompt information; and generating at least one display object data according to the at least one display object in the first image, and transmitting the at least one display object data to a terminal corresponding to the first user account, so that the terminal corresponding to the first user account generates the object following request according to the at least one display object data.

In an embodiment, the image update prompt information includes group prompt information and session prompt information; in executing the operation of obtaining a second image, the processor 1001 specifically executes the following operations: obtaining the second image transmitted by a third user account in the communication group; and in executing the operation of pushing image update prompt information for the target image to the first user account according to the object following relationship, the processor 1001 specifically executes the following operations: determining the first user account according to the target display object and the object following relationship; creating a target association session according to the third user account and the first user account; pushing the group prompt information for the target image to a terminal corresponding to the first user account according to the communication group, so that the terminal corresponding to the first user account displays the group prompt information in the communication group; and pushing the session prompt information for the target image to a terminal corresponding to the first user account according to the target association session, so that the terminal corresponding to the first user account displays the session prompt information in the target association session.

In this embodiment of this disclosure, an object following page may be displayed in a first session page in response to an object following operation performed on a first image. The object following page includes at least one display object in the first image and a setting control corresponding to the at least one display object respectively. The first session page is a page corresponding to a current user terminal, and a user account used by the current user terminal to log in to the communication application is a local user account. In response to a trigger operation performed on a target setting control in the object following page, because the display objects correspond one-to-one to the setting controls, the target display object corresponding to the target setting control may be determined, and further, an object following relationship may be created for the target display object and the local user account. Subsequently, if a new image is obtained and the new image is associated with the target display object, an image update prompt may be provided to the local user account according to the object following relationship. It can be seen from the above that according to this embodiment of this disclosure, the user may perform an object following operation on the target display object (for example, a portrait of the user or an object of interest to the user) in the first image, and when other user accounts share second images associated with the target display object, the user receives an update prompt for these images. In this way, the user can view images related to the user. Because the images that are not related to the user can be filtered out, the efficiency of message viewing can be improved.

An embodiment of this disclosure further provides a computer-readable storage medium, the computer-readable storage medium storing a computer program, the computer program including program instructions. The program instructions, when executed by a processor, implement the image processing method provided by the steps in FIG. 3 and FIG. 11. Reference may be made to the implementations provided in the steps in FIG. 3 and FIG. 11 for details, which will not be repeated here.

The computer-readable storage medium may be the image processing apparatus provided in any one of the foregoing embodiments or an internal storage unit of the computer device described above, for example, a hard disk or an internal memory of the computer device. The computer-readable storage medium may alternatively be an external storage device of the computer device, for example, a removable hard disk, a smart media card (SMC), a secure digital (SD) card, or a flash card equipped on the computer. Further, the computer-readable storage medium may include both an internal storage unit and an external storage device of the computer device. The computer-readable storage medium is configured to store the computer program and other program and data that are required by the computer device. The computer-readable storage medium may further be configured to temporarily store data that has been output or data to be output.

In the specification, claims, and accompanying drawings of the embodiments of this disclosure, the terms "first" and "second" are intended to distinguish between different objects but do not indicate a particular order. In addition, the terms "include", "have", and any variant thereof are intended to cover a non-exclusive inclusion. For example, a process, method, apparatus, product, or device that includes a series of steps or modules is not limited to the listed steps or modules, but further includes a step or unit that is not listed, or further includes another step or unit that is intrinsic to the process, method, apparatus, product, or device.

A person skilled in the art may further realize that, in combination with the embodiments herein, units and algorithm, steps of each example described can be implemented with electronic hardware, computer software, or the combination thereof. In order to clearly describe the interchangeability between the hardware and the software, compositions and steps of each example have been generally described according to functions in the foregoing descriptions. Whether the functions are executed in a mode of hardware or software depends on particular applications and design constraint conditions of the technical solutions. A person skilled in the art may use different methods to implement the described functions for each particular application, but it is not to be considered that the implementation goes beyond the scope of this disclosure.

The methods and related apparatuses provided in the embodiments of this disclosure are described with reference to the method flowcharts and/or schematic structural diagrams provided in the embodiments of this disclosure. Specifically, each process and/or block of the method flowcharts and/or schematic structural diagrams, and combination of processes and/or blocks in the flowcharts and/or block diagrams, may be implemented by program instructions. These computer program instructions may be provided to a general-purpose computer, a dedicated computer, an embedded processor, or a processor of another programmable data processing apparatus to generate a machine, so that the instructions executed by the computer or the processor of the another programmable data processing apparatus generate an apparatus for implementing a specific function in one or more processes in the flowcharts and/or in one or more blocks in the schematic structural diagrams. These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the schematic structural diagrams. These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the schematic structural diagrams.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. An image processing method, executed by a computer device, the method comprising:
   displaying an object following page in a first group communication session page in response to an object following operation performed on a first image, the object following page comprising a setting control and plural face images, including at least one face image included in the first image, wherein each of the plural face images is included in one or more images shared in the first group communication session page, and the first group communication session page being a page corresponding to a local user account participating in the group communication; and
   creating, by processing circuitry of the computer device, an object following relationship between a selected face image among the plural face images and the local user account in response to a trigger operation performed on the setting control of the selected face image in the object following page, the object following relationship providing an image update prompt to the local user account, the image update prompt prompting to view an image associated with the selected face image.

2. The method according to claim 1, wherein the displaying comprises:
   displaying the first image and object following prompt information for the first image in the first group communication session page; and
   displaying the object following page in response to the object following operation performed on the object following prompt information.

3. The method according to claim 1, wherein the displaying comprises:
   displaying the first image in the first group communication session page, and displaying a first image details page in response to a trigger operation performed on a sub-image in the first image, the first image details page comprising the sub-image, a first multi-function control, and a second multi-function control;
   displaying a first image list comprising the first image in response to a trigger operation performed on the first multi-function control, and displaying the object following page in response to a trigger operation performed on an object display control in the first image list; and
   outputting a multi-function sub-page displayed on the first image details page in response to a trigger operation performed on the second multi-function control, and displaying the object following page in response to a trigger operation performed on the multi-function sub-page.

4. The method according to claim 3, wherein
   the multi-function sub-page comprises an object following control and an image saving control; and
   the displaying comprises:
   displaying the object following page in response to a trigger operation performed on the object following control;
   switching from the multi-function sub-page to an object following option sub-page displayed on the first image details page, in response to a trigger operation performed on the image saving control, the object following option sub-page comprising a cancel control and a follow control;
   saving the sub-image in response to a trigger operation performed on the cancel control; and
   in response to a trigger operation performed on the follow control, saving the sub-image and displaying the object following page.

5. The method according to claim 1, wherein
   the displaying comprises:
   displaying the first image in the first group communication session page, and displaying the object following page in response to a trigger operation performed on the first image, the object following page comprising the first image and an object following area, and the object following area comprising the at least one face image in the first image; and
   the creating comprises:
   displaying a to-be-followed object details page in response to the trigger operation performed on the setting control in the object following area, the to-be-followed object details page comprising an object name control, an object following control in a non-followed state, and the selected face image;
   displaying a name setting page in response to a trigger operation performed on the object following control in the non-followed state;
   displaying the name setting page in which an object name has been inputted, in response to a name input operation performed on the name setting page, the name setting page comprising a first confirmation control; and
   displaying a followed object details page in response to a trigger operation performed on the first confirmation control, the followed object details page comprising the object name control indicating the object name, the object following control in a followed state, and the selected face image, and the object following control in the followed state representing that the object following relationship has been created between the selected face image and the local user account.

6. The method according to claim 5, wherein the method further comprises:
   obtaining a second image; and
   displaying, in response to a determination that an object matching the selected face image exists in the second image, image update prompt information according to the object following relationship.

7. The method according to claim 6, wherein
   the image update prompt information comprises first prompt information and second prompt information; and the displaying, in response to the determination that the object matching the selected face image exists in the second image, the image update prompt information comprises:
- generating, in response to the determination that the object matching the selected face image exists in the second image, the first prompt information and the second prompt information that are associated with the object name according to the object following relationship;
- displaying the first prompt information in a user interaction page, the user interaction page comprising an interaction area for displaying the first prompt information;
- displaying a second session page in response to a trigger operation performed on the interaction area, and displaying the second prompt information in the second session page, the second session page comprising the second image; and
- displaying a target object details page comprising a portion of the second image including the object in response to a trigger operation performed on the second prompt information.

8. The method according to claim 6, wherein the method further comprises:
- displaying a second image list in response to a trigger operation performed on the image update prompt information, the second image list including a portion of the second image including the object and an object prompt sign; and
- displaying a second image details page in response to a trigger operation performed on the portion of the second image including the object, and displaying the portion of the second image including the object and a target prompt box in the second image details page, the target prompt box indicating a display area of the object matching with the selected face image in the portion of the second image including the object.

9. The method according to claim 1, wherein
the setting control comprises an object setting control; and
the creating comprises:
- displaying a to-be-followed object details page in response to the trigger operation performed on the object setting control in the object following page, the to-be-followed object details page comprising an object name control, an object following control in a non-followed state, and the selected face image;
- displaying a name setting page in response to a trigger operation performed on the object name control;
- outputting an associated name list displayed on the name setting page in response to a name input operation performed on the name setting page, and displaying a transition object details page in response to a trigger operation performed on a selected name from the associated name list, the transition object details page comprising the object name control indicating the selected name, the object following control in the non-followed state, and the selected face image, and
- creating the object following relationship for the selected face image and the local user account in response to a trigger operation performed on the transition object details page.

10. The method according to claim 9, wherein
the transition object details page comprises a return control; and
the creating comprises:
- displaying a transition object following page in response to a trigger operation performed on the return control, the transition object following page comprising the selected face image marked with the selected name, and a following setting control for instructing to create an object following relationship between the selected face image and the local user account; and
- displaying a followed object details page in response to a trigger operation performed on the object following control in the non-followed state, the followed object details page comprising the object name control indicating the selected name, the object following control in a followed state, and the selected face image, the object following control in the followed state representing that the object following relationship has been created between the selected face image and the local user account.

11. The method according to claim 1, wherein
the object following page comprises a following setting control; and
the creating comprises:
- displaying a name setting page in response to a trigger operation performed on the following setting control in the object following page, the name setting page comprising the selected face image corresponding to the following setting control;
- outputting an associated name list displayed on the name setting page in response to a name input operation performed on the name setting page, and displaying the name setting page comprising the selected face image marked with a selected name in response to a trigger operation performed on the selected name in the associated name list, the name setting page comprising a second confirmation control; and
- transmitting an object following request to a server in response to a trigger operation performed on the second confirmation control, the object following request causing the server to create the object following relationship between the selected face image having the selected name and the local user account according to the object following request, the object following request indicating the local user account, the selected name, and the selected face image.

12. An image processing apparatus, comprising:
processing circuitry configured to
- display an object following page in a first group communication session page in response to an object following operation performed on a first image, the object following page comprising a setting control and plural face images, including at least one face image included in the first image, wherein each of the plural face images is included in one or more images shared in the first group communication session page, and the first group communication session page being a page corresponding to a local user account participating in the group communication; and
- create an object following relationship between a selected face image among the plural face images and the local user account in response to a trigger operation performed on the setting control of the selected face image in the object following page, the object following relationship providing an image update prompt to the local user account, the image update prompt prompting to view an image associated with the selected face image.

13. The apparatus according to claim 12, wherein the processing circuitry is further configured to:
   display the first image and object following prompt information for the first image in the first group communication session page; and
   display the object following page in response to the object following operation performed on the object following prompt information.

14. The apparatus according to claim 12, wherein the processing circuitry is further configured to:
   display the first image in the first group communication session page, and display a first image details page in response to a trigger operation performed on a sub-image in the first image, the first image details page comprising the sub-image, a first multi-function control, and a second multi-function control;
   display a first image list comprising the first image in response to a trigger operation performed on the first multi-function control, and display the object following page in response to a trigger operation performed on an object display control in the first image list; and
   output a multi-function sub-page displayed on the first image details page in response to a trigger operation performed on the second multi-function control, and display the object following page in response to a trigger operation performed on the multi-function sub-page.

15. The apparatus according to claim 14, wherein
   the multi-function sub-page comprises an object following control and an image saving control; and
   the processing circuitry is further configured to:
      display the object following page in response to a trigger operation performed on the object following control;
      switch from the multi-function sub-page to an object following option sub-page displayed on the first image details page, in response to a trigger operation performed on the image saving control, the object following option sub-page comprising a cancel control and a follow control;
      save the sub-image in response to a trigger operation performed on the cancel control; and
      in response to a trigger operation performed on the follow control, save the sub-image and display the object following page.

16. The apparatus according to claim 12, wherein the processing circuitry is further configured to:
   display the first image in the first group communication session page, and display the object following page in response to a trigger operation performed on the first image, the object following page comprising the first image and an object following area, and the object following area comprising the at least one face image in the first image;
   display a to-be-followed object details page in response to the trigger operation performed on the setting control in the object following area, the to-be-followed object details page comprising an object name control, an object following control in a non-followed state, and the selected face image;

display a name setting page in response to a trigger operation performed on the object following control in the non-followed state;
display the name setting page in which an object name has been inputted, in response to a name input operation performed on the name setting page, the name setting page comprising a first confirmation control; and
display a followed object details page in response to a trigger operation performed on the first confirmation control, the followed object details page comprising the object name control indicating the object name, the object following control in a followed state, and the selected face image, and the object following control in the followed state representing that the object following relationship has been created between the selected face image and the local user account.

17. The apparatus according to claim 12, wherein
the setting control comprises an object setting control; and
the processing circuitry is further configured to:
   display a to-be-followed object details page in response to the trigger operation performed on the object setting control in the object following page, the to-be-followed object details page comprising an object name control, an object following control in a non-followed state, and the selected face image;
   display a name setting page in response to a trigger operation performed on the object name control;
   output an associated name list displayed on the name setting page in response to a name input operation performed on the name setting page, and display a transition object details page in response to a trigger operation performed on a selected name from the associated name list, the transition object details page comprising the object name control indicating the selected name, the object following control in the non-followed state, and the selected face image, and
   create the object following relationship for the selected face image and the local user account in response to a trigger operation performed on the transition object details page.

18. The apparatus according to claim 17, wherein
the transition object details page comprises a return control; and
the processing circuitry is further configured to:
   display a transition object following page in response to a trigger operation performed on the return control, the transition object following page comprising the selected face image marked with the selected name, and a following setting control for instructing to create an object following relationship between the selected face image and the local user account; and
   display a followed object details page in response to a trigger operation performed on the object following control in the non-followed state, the followed object details page comprising the object name control indicating the selected name, the object following control in a followed state, and the selected face image, the object following control in the followed state representing that the object following relationship has been created between the selected face image and the local user account.

* * * * *